United States Patent
Allen et al.

(10) Patent No.: US 9,798,639 B2
(45) Date of Patent: Oct. 24, 2017

(54) FAILOVER SYSTEM AND METHOD REPLICATING CLIENT MESSAGE TO BACKUP SERVER FROM PRIMARY SERVER

(71) Applicant: TSX INC., Toronto (CA)

(72) Inventors: Gregory A. Allen, Oakville (CA); Tudor Morosan, Toronto (CA); Adrian G. Dumitrache, Toronto (CA); Patrick J. Philips, Bethany (CA)

(73) Assignee: TSX INC., Toronto (CA)

( * ) Notice: Subject to any disclaimer, the term of this patent is extended or adjusted under 35 U.S.C. 154(b) by 174 days.

(21) Appl. No.: 14/888,187

(22) PCT Filed: Oct. 23, 2013

(86) PCT No.: PCT/CA2013/000903
§ 371 (c)(1),
(2) Date: Oct. 30, 2015

(87) PCT Pub. No.: WO2014/197963
PCT Pub. Date: Dec. 18, 2014

(65) Prior Publication Data
US 2016/0062854 A1    Mar. 3, 2016

Related U.S. Application Data

(60) Provisional application No. 61/834,600, filed on Jun. 13, 2013.

(51) Int. Cl.
*G06F 11/00*    (2006.01)
*G06F 11/20*    (2006.01)
(Continued)

(52) U.S. Cl.
CPC ...... *G06F 11/2097* (2013.01); *G06F 11/1637* (2013.01); *G06F 11/2028* (2013.01);
(Continued)

(58) Field of Classification Search
CPC ............. G06F 11/1629; G06F 11/1637; G06F 11/1658; G06F 11/202; G06F 11/2023;
(Continued)

(56) References Cited

U.S. PATENT DOCUMENTS 7,434,096 B2    10/2008  Callaway et al.
7,519,859 B2     4/2009  Ozawa et al.
(Continued)

FOREIGN PATENT DOCUMENTS

WO    WO-03048936 A1    6/2003
WO    WO2013033827 A1   3/2013

OTHER PUBLICATIONS

International Search Report issued by the Canadian Intellectual Property Office dated Dec. 9, 2013 for corresponding International Patent Application No. PCT/CA2013/000903 filed Oct. 23, 2013.
(Continued)

*Primary Examiner* — Gabriel Chu
(74) *Attorney, Agent, or Firm* — Perry + Currier Inc.

(57) ABSTRACT

A failover system, server, method, and computer readable medium are provided. The system includes a primary server for communicating with a client machine and a backup server. The primary server includes a primary session manager, a primary dispatcher a primary order processing engine and a primary verification engine. The method involves receiving an input message, obtaining deterministic information, processing the input message and replicating the input message along with the deterministic information.

43 Claims, 15 Drawing Sheets

(51) Int. Cl.
- H04L 29/08 (2006.01)
- G06F 11/16 (2006.01)
- H04L 29/14 (2006.01)
- G06Q 40/04 (2012.01)

(52) U.S. Cl.
CPC ...... *H04L 67/1095* (2013.01); *H04L 67/1097* (2013.01); *H04L 69/40* (2013.01); *G06F 2201/85* (2013.01); *G06Q 40/04* (2013.01)

(58) Field of Classification Search
CPC ............ G06F 11/2028; G06F 11/2097; G06F 2201/85; H04L 67/1095; H04L 69/40
See application file for complete search history.

(56) References Cited

U.S. PATENT DOCUMENTS

| | | | |
|---|---|---|---|
| 7,631,214 B2 | 12/2009 | Bockhold et al. | |
| 7,711,986 B2 | 5/2010 | Ozawa et al. | |
| 7,725,764 B2 | 5/2010 | Morosan et al. | |
| 7,975,173 B2 | 7/2011 | Callaway et al. | |
| 7,975,174 B2 | 7/2011 | Morosan et al. | |
| 7,996,517 B2 | 8/2011 | Carter et al. | |
| 8,156,177 B2 | 4/2012 | Bein et al. | |
| 8,190,572 B2 | 5/2012 | Anguelov | |
| 8,191,078 B1 | 5/2012 | Cullen et al. | |
| 9,053,073 B1* | 6/2015 | Subramanian | G06F 11/2064 |
| 2003/0225760 A1* | 12/2003 | Ruuth | G06F 11/1471 |
| 2004/0103342 A1* | 5/2004 | Moser | G06F 11/2038 |
| | | | 714/4.4 |
| 2005/0138461 A1 | 6/2005 | Allen et al. | |
| 2006/0020635 A1* | 1/2006 | Green | G06F 11/2097 |
| 2006/0143528 A1* | 6/2006 | Edwards | G06F 11/1658 |
| | | | 714/35 |
| 2006/0179081 A1* | 8/2006 | Vedula | G06F 11/2097 |
| 2007/0180302 A1 | 8/2007 | Allen et al. | |
| 2007/0203976 A1 | 8/2007 | Bein et al. | |
| 2008/0126832 A1* | 5/2008 | Morosan | G06F 11/2028 |
| | | | 714/4.12 |
| 2008/0172572 A1* | 7/2008 | Beardsley | G06F 11/2069 |
| | | | 714/6.12 |
| 2009/0037320 A1 | 2/2009 | Tully et al. | |
| 2009/0138531 A1* | 5/2009 | Horii | G06F 9/466 |
| 2011/0016349 A1* | 1/2011 | Harpaz | G06F 11/2041 |
| | | | 714/4.11 |
| 2011/0225448 A1 | 9/2011 | Morosan et al. | |
| 2011/0231301 A1 | 9/2011 | McLean | |
| 2012/0110372 A1 | 5/2012 | Borgendale et al. | |
| 2013/0060887 A1 | 3/2013 | Bradnick et al. | |
| 2013/0246597 A1* | 9/2013 | Iizawa | H04L 69/40 |
| | | | 709/223 |

OTHER PUBLICATIONS

Written Opinion of the International Authority issued by the Canadian Intellectual Property Office dated Dec. 9, 2013 for corresponding International Patent Application No. PCT/CA2013/000903 filed Oct. 23, 2013.

International Preliminary Report of Patentability issued by the International Bureau dated Dec. 15, 2015 for corresponding International Patent Application No. PCT/CA2013/000903 filed Oct. 23, 2013.

Extended European Search Report dated Dec. 7, 2016 for European Patent Application No. 13886803.9.

* cited by examiner

FAILOVER SYSTEM AND METHOD REPLICATING CLIENT MESSAGE TO BACKUP SERVER FROM PRIMARY SERVER

FIELD

The present invention relates to computer and network architecture and more particularly relates to a failover system and method.

BACKGROUND

Society is increasingly relying on computers and networks to interact and conduct business. To achieve a high level of availability demanded in critical systems, unplanned downtime caused by software and hardware defects should be minimized.

The financial services industry is but one example of an industry that demands highly available systems. Indeed, a large number of data processing activities in today's financial industry are supported by computer systems. Particularly interesting are the so-called "real-time" and "near real-time" On-Line Transaction Processing (OLTP) applications, which typically process large numbers of business transactions over a prolonged period, with high speed and low latency. These applications generally exhibit the following characteristics: (1) complex and high speed data processing, (2) reliable non-volatile data storage, and (3) high level of availability, i.e. the ability to support the services on a substantially uninterrupted basis. When implemented, existing applications tend to tradeoff between these performance requirements due to their contradictory effects on the system behavior and no designs can completely satisfy all of three characteristics simultaneously, as outlined in greater detail below.

First, complex data processing refers to the ability to perform, in a timely fashion, a large number of computations, database retrievals/updates, etc. This can be implemented through parallel processing, where multiple units of work are executed simultaneously on the same physical machine or on a distributed network. In some systems, the outcome of each transaction depends on the outcomes of previously completed transactions. The parallel aspects of such systems are, inherently, non-deterministic: due to race conditions, operating system scheduling tasks, or variable network delays, the sequence of message and thread execution cannot be predicted, nor can they be processed in parallel simply by passing copies of input message to a duplicate system. Non-deterministic systems have non-identical output. Therefore, non-deterministic systems present severe challenges to running two processes in parallel on two different computing machines with the intention of having one substitute for the other in case of failure.

Second, reliable non-volatile data storage refers to the ability to store the processed data persistently, even if a number of the system's software or hardware components experience unexpected failure. This can usually be implemented by using Atomic, Consistent, Isolated, and Durable ("ACID") transactions when accessing or modifying the shared data. ACID transactions can ensure the data integrity and persistence as soon as a unit of work is completed. Every committed ACID transaction is written into the non-volatile computer memory (hard-disk), which helps ensure the data durability, but it is very costly in terms of performance and typically slows down the whole system.

Third, highly available systems attempt to ensure that percentage of availability of a given computer system is as close as possible to 100% of the time. Such availability can be implemented through redundant software and/or hardware, which takes over the functionality in the event a component failure is detected. In order to succeed, the failover replicates not only the data, but also the process state. As will be appreciated by those of skill in the art, state replication can be particularly challenging in non-deterministic systems (i.e. systems where computational processing of the same set of events can have more than one result depending on the order in which those events are processed).

Highly available software applications are usually deployed on redundant environments to reduce and/or eliminate the single point of failure that is commonly associated with the underlying hardware. Two common approaches generally considered to be a form of high availability are known as hot failover and warm failover. Hot failover refers to simultaneously processing the same input in multiple systems, essentially providing complete redundancy in the event of a failure in one of those systems. Warm failover refers to replicating the state of the application (i.e. the data) in backup systems, without processing that data in the backup systems, but having applications capable of processing that data loaded and standing by in the event of failure of a primary system. Cold failover which is not considered by many to be a form of high availability, is another type of failover method refers to simply powering-up a backup system and preparing that backup system to assume processing responsibilities from the primary system.

In hot failover configurations, two instances of the application are simultaneously running on two different hardware facilities, processing copies of the same input. If one of facilities experiences a critical failure, a supplemental synchronization system can ensure that the other one will continue to support the workload. In the warm failover configurations, one of the systems, designated primary, is running the application; in case of failure, the second system, designated backup, which is waiting in a standby state, will "wake up", take over, and resume the functionality.

Prior art hot failover approaches have at least two disadvantages. First, supplemental software has to run in order to keep the two systems synchronized. In the case of non-deterministic systems, this synchronization effort can lead to an unacceptable (or otherwise undesirable) decrease in performance and complexity where the order of arrival of events must be guaranteed to be identical. Also, prior art concurrent systems used in such applications typically allow multiple threads to execute simultaneously, so they are inherently non-deterministic. Also non-deterministic are the systems with servers and geographically distributed clients, where the variable network delay delivers the messages to the server in an unpredictable sequence.

Warm failover can be used to overcome certain problems associated with hot failover. Warm failover can be another way to implement failover of non-deterministic systems by replicating the system data to a redundant backup system and then restoring the application functionality to the secondary system. This approach has its drawbacks in the time required to recover the data to a consistent state, then to bring the application to a functional state, and lastly, to return the application to the point in processing where it left off. This process normally takes hours, requires manual intervention, and cannot generally recover in-flight transactions.

A number of patents attempt to address at least some of the foregoing problems. U.S. Pat. No. 5,305,200 proposes a non-repudiation mechanism for communications in a negotiated trading scenario between a buyer/seller and a dealer (market maker). Redundancy is provided to ensure the non-repudiation mechanism works in the event of a failure. It does not address the failover of an on-line transactional application in a non-deterministic environment. In simple terms, U.S. Pat. No. 5,305,200 is directed to providing an unequivocal answer to the question: "Was the order sent, or not?" after experiencing a network failure.

U.S. Pat. No. 5,381,545 proposes a technique for backing up stored data (in a database) while updates are still being made to the data. U.S. Pat. No. 5,987,432 addresses a fault-tolerant market data ticker plant system for assembling world-wide financial market data for regional distribution. This is a deterministic environment, and the solution focuses on providing an uninterrupted one-way flow of data to the consumers. U.S. Pat. No. 6,154,847 provides an improved method of rolling back transactions by combining a transaction log on traditional non-volatile storage with a transaction list in volatile storage. U.S. Pat. No. 6,199,055 proposes a method of conducting distributed transactions between a system and a portable processor across an unsecured communications link. U.S. Pat. No. 6,199,055 deals with authentication, ensuring complete transactions with remote devices, and with resetting the remote devices in the event of a failure. In general, the foregoing does not address the failover of an on-line transactional application in a non-deterministic environment.

U.S. Pat. No. 6,202,149 proposes a method and apparatus for automatically redistributing tasks to reduce the effect of a computer outage. The apparatus includes at least one redundancy group comprised of one or more computing systems, which in turn are themselves comprised of one or more computing partitions. The partition includes copies of a database schema that are replicated at each computing system partition. The redundancy group monitors the status of the computing systems and the computing system partitions, and assigns a task to the computing systems based on the monitored status of the computing systems. One problem with U.S. Pat. No. 6,202,149 is that it does not teach how to recover workflow when a backup system assumes responsibility for processing transactions, but instead directs itself to the replication of an entire database which can be inefficient and/or slow. Further, such replication can cause important transactional information to be lost in flight, particularly during a failure of the primary system or the network interconnecting the primary and backup system, thereby leading to an inconsistent state between the primary and backup. In general, U.S. Pat. No. 6,202,149 lacks certain features that are desired in the processing of on-line transactions and the like, and in particular lacks features needed to failover non-deterministic systems.

U.S. Pat. No. 6,308,287 proposes a method of detecting a failure of a component transaction, backing it out, storing a failure indicator reliably so that it is recoverable after a system failure, and then making this failure indicator available to a further transaction. It does not address the failover of a transactional application in a non-deterministic environment.

U.S. Pat. No. 6,574,750 proposes a system of distributed, replicated objects, where the objects are non-deterministic. It proposes a method of guaranteeing consistency and limiting roll-back in the event of the failure of a replicated object. A method is described where an object receives an incoming client request and compares the request ID to a log of all requests previously processed by replicas of the object. If a match is found, then the associated response is returned to the client. However, this method in isolation is not sufficient to solve the various problems in the prior art. Another problem is that the method of U.S. Pat. No. 6,575,750 assumes a synchronous invocation chain, which is inappropriate for high-performance On-Line Transaction Processing ("OLTP") applications. With a synchronous invocation the client waits for either a reply or a time-out before continuing. The invoked object in turn can become a client of another object, propagating the synchronous call chain. The result can be an extensive synchronous operation, blocking the client processing and requiring long time-outs to be configured in the originating client.

SUMMARY

In accordance with an aspect of the specification, there is provided a system for failover. The system includes a primary server configured to communicate with a client machine. In addition, the system includes a backup server in communication with the primary server. The backup server is configured to communicate with the client machine during failover. The primary server includes a primary session manager configured to receive an input message from the client machine. The primary server further includes a primary dispatcher configured to perform an external call to obtain a sequence number. The primary dispatcher is further configured to dispatch the input message, a result of the external call, and the sequence number to an associated primary trading engine component (also referred to as a primary engine component more generally for other order processing applications). The primary dispatcher is further configured to dispatch the input message, the result of the external call, and the sequence number to the backup server. The primary server also includes a primary trading engine (also referred to as an order processing engine for other applications) having a plurality of primary trading engine components. The primary trading engine is configured to process the input message to generate a primary output message. Each primary trading engine component is configured to process an input message type. Furthermore, the primary server includes a primary verification engine configured to receive the primary output message. The primary verification engine is further configured to send a verification message to the backup server and to send the primary output message to the session manager for sending to the client machine. The backup server includes a backup session manager configured to assume a primary role during a failover event. The backup server further includes a backup dispatcher configured to receive the input message, the result of the external call, and the sequence number from the primary dispatcher. The backup dispatcher is further configured to dispatch the input message, the result of the external call, and the sequence number to an associated backup trading engine component (also referred to as a backup engine component more generally for other order processing applications). The backup server also includes a backup trading engine having a plurality of backup trading engine components. Each backup trading engine component is configured to process a backup message type to generate a backup output message. Furthermore, the backup server includes a backup verification engine configured to receive the backup output message from the backup trading engine and the verification message from the primary verification engine. The backup verification engine is further configured to compare the verification message with the backup output message for verifying the primary output message.

The backup dispatcher may be further configured to generate a confirmation message after receiving the input message, the result of the external call, and the sequence number from the primary dispatcher.

The backup dispatcher may be further configured to send the confirmation message to the primary verification engine.

The primary verification engine may be further configured to wait for the confirmation message prior to sending the primary output message to the session manager for sending to the client machine.

The verification message may include a copy of the primary output message.

The system may further include a low latency link for connecting the primary server to the backup server.

The low latency link may include a PCIe link.

The input message may be associated with one of a buy order or a sell order for a stock.

The input message type may be associated with a group of stocks.

The external call may include a request for a timestamp.

The external call may include a request for a market feed.

In accordance with another aspect of the specification, there is provided a server of the system described herein.

In accordance with another aspect of the specification, there is provided a method of failover performed by the system described herein.

In accordance with another aspect of the specification, there is provided a non-transitory computer readable medium storing a set of programming instructions configured to direct a processor to carry out the method described herein.

In accordance with an aspect of the specification, there is provided a system for failover. The system includes a primary server configured to communicate with a client machine. In addition, the system includes a backup server in communication with the primary server. The backup server is configured to communicate with the client machine during failover. The primary server includes a primary session manager configured to receive an input message from the client machine. The primary server further includes a primary dispatcher configured to obtain a sequence number and a timestamp. The primary dispatcher is further configured to dispatch the input message, the sequence number, and the timestamp to an associated primary engine component. The primary dispatcher is further configured to replicate the input message, the sequence number, and the timestamp to the backup server. The primary server also includes a primary order processing engine having a plurality of primary engine components. The primary order processing engine is configured to process the input message to generate a primary output message. Each primary engine component is configured to process an input message type. Furthermore, the primary server includes a primary verification engine configured to receive the primary output message. The primary verification engine is further configured to send a verification message to the backup server and to send the primary output message to the session manager for sending to the client machine. The backup server includes a backup session manager configured to assume a primary role during a failover event. The backup server further includes a backup dispatcher configured to receive the input message, the result of the external call, and the sequence number from the primary dispatcher. The backup dispatcher is further configured to dispatch the input message, the result of the external call, and the sequence number to an associated backup engine component. The backup server also includes a backup order processing engine having a plurality of backup engine components. Each backup engine component is configured to process a backup message type to generate a backup output message. Furthermore, the backup server includes a backup verification engine configured to receive the backup output message from the backup order processing engine and the verification message from the primary verification engine. The backup verification engine is further configured to compare the verification message with the backup output message for verifying the primary output message.

In accordance with an aspect of the specification, there is provided a primary server for communicating with a client machine. The primary server includes a primary session manager configured to receive an input message from the client machine. The primary server also includes a primary dispatcher configured to obtain a sequence number and a timestamp, the primary dispatcher further configured to dispatch the input message and the sequence number to an associated primary engine component, the primary dispatcher further configured to replicate the input message, the sequence number, and the timestamp to a backup server. In addition, the primary server includes a primary order processing engine having a plurality of primary engine components including the associated primary engine component, the primary order processing engine configured to process the input message to generate a primary output message, each primary engine component configured to process an input message type. Furthermore, the primary server includes a primary verification engine configured to receive the primary output message, the primary verification engine further configured to send a verification message to the backup server and to send the primary output message to the session manager for sending to the client machine.

In accordance with an aspect of the specification, there is provided a method of processing orders at a primary server. The method involves receiving an input message from a client machine at a primary session manager. The method also involves obtaining a sequence number and a timestamp from a primary dispatcher. Furthermore, the method involves dispatching, from the primary dispatcher, the input message, the sequence number, and the timestamp to an associated primary engine component. In addition, the method involves replicating, from the primary dispatcher, the input message, the sequence number, and the timestamp to a backup server. The method further involves processing the input message at a primary engine component to generate a primary output message, wherein the primary engine component configured to process an input message type. Also, the method involves receiving the primary output message at a primary verification engine. The method additionally involves sending a verification message from the primary verification engine to the backup server. The method involves sending the primary output message to the session manager for sending to the client machine.

In accordance with an aspect of the specification, there is provided a non-transitory computer readable medium encoded with codes. The codes direct a processor to receive an input message from a client machine. The codes further direct the processor to obtain a sequence number and a timestamp. In addition, the codes direct the processor to dispatch the input message, the sequence number, and the timestamp to an associated primary engine component. Furthermore, the codes direct the processor to replicate, from the primary dispatcher, the input message, the sequence number, and the timestamp to a backup server. The codes also direct the processor to process the input message at a primary engine component to generate a primary output message, wherein the primary engine component configured to process an input message type. The codes further direct the processor to receive the primary output message at a primary verification engine and to send a verification message from the primary verification engine to the backup server. Furthermore, the codes further direct the processor to send the primary output message to the session manager for sending to the client machine.

BRIEF DESCRIPTION OF THE DRAWINGS

Reference will now be made, by way of example only, to the accompanying drawings in which.

DETAILED DESCRIPTION OF THE EMBODIMENTS

Figure 1:
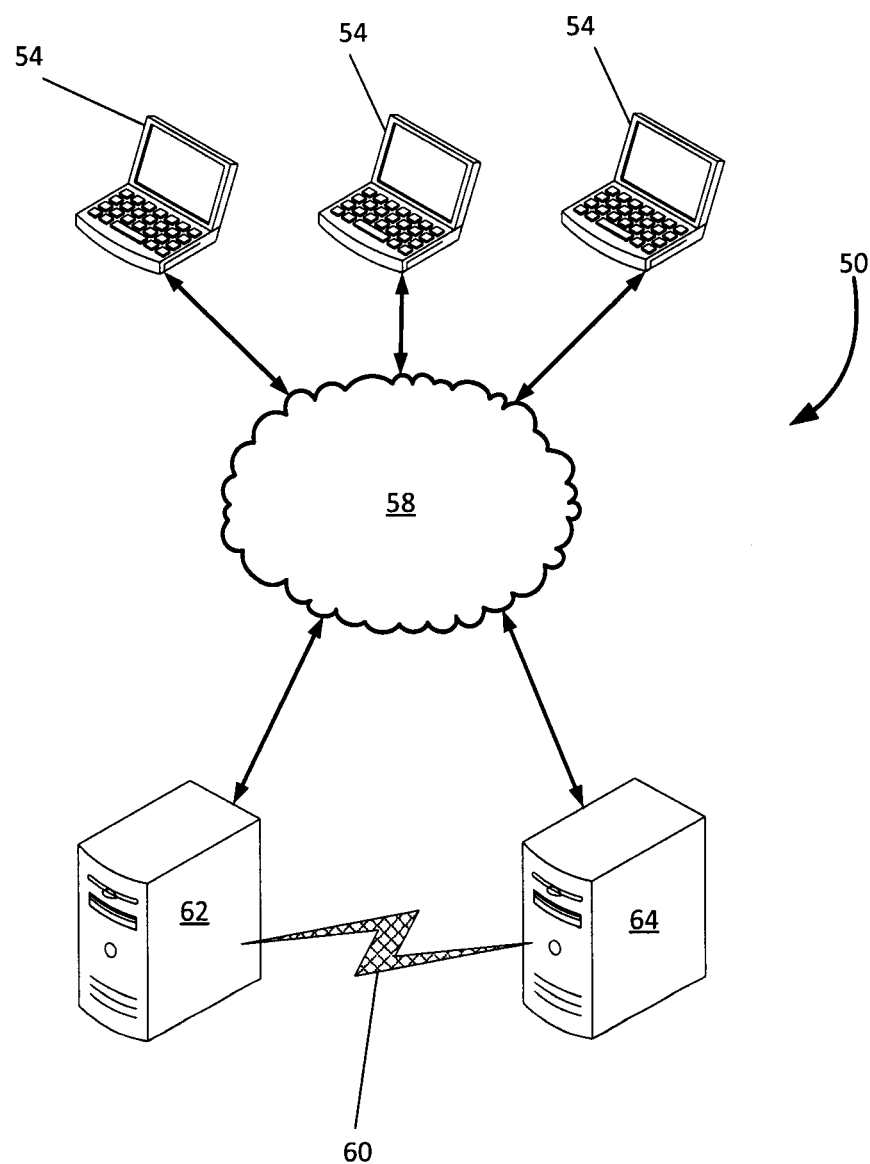
FIG. 1 is a schematic representation of a failover system in accordance with an embodiment.

Referring now to FIG. 1, a schematic block diagram of a system for failover is indicated generally at 50. It is to be understood that the system 50 is purely exemplary and it will be apparent to those skilled in the art that a variety of systems for failover are contemplated. The system 50 includes a plurality of client machines 54 connected to a network 58. The network 58 can be any type of computing network, such as the Internet, a local area network, a wide area network or combinations thereof. In turn, the network 58 is connected to a primary server 62 and a backup server 64. In the present embodiment, the primary server 62 and the backup server 64 are connected via a direct connection 60. Accordingly, each client machine 54 can communicate with the primary server 62 and/or the backup server 64 via the network 58, and the primary server 62 and the backup server 64 can communicate with each other using the direct connection 60 as will be discussed in greater detail below. In this description, one client machine 54 is discussed. However, it should be understood that more than one client machine 54 is contemplated.

Figure 2:
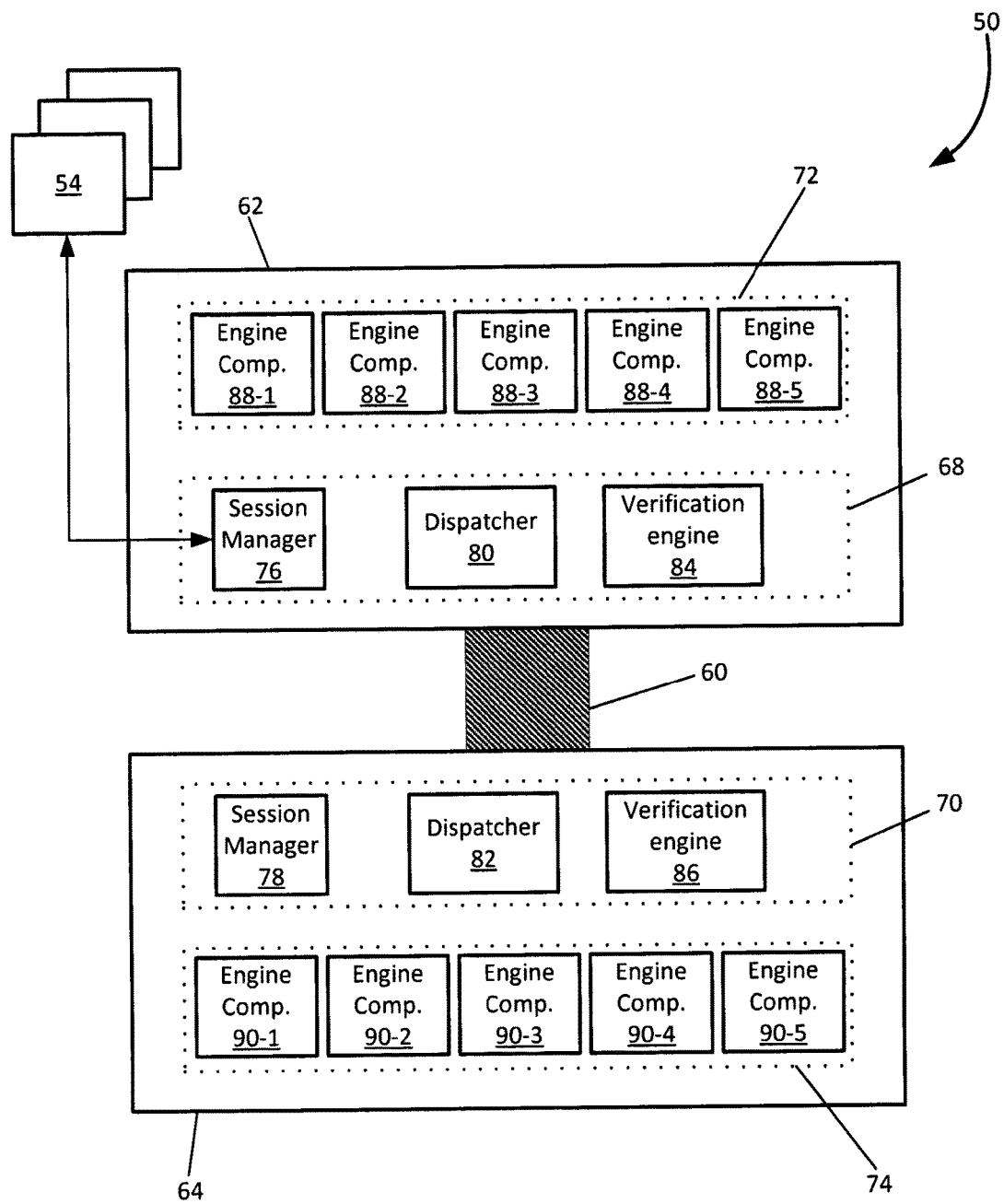
FIG. 2 is a schematic representation of a first and second server in accordance with the embodiment shown in FIG. 1.

Referring to FIG. 2, a schematic block diagram of showing various components of the primary server 62 and the backup server 64 is illustrated. In the present embodiment, the direct connection 60 is a low latency link capable of transmitting and receiving messages between the primary server 62 and the backup server 64 at high a speed with accuracy. For example, the direct connection 60 can include a peripheral component interconnect express (PCIe) link such that the primary server 62 can write data directly to a memory of the backup server 64 and vice versa. It should be emphasized that the structure in FIG. 2 is purely exemplary and that variations are contemplated. For example, it is to be appreciated, with the benefit of this description, that the direct connection 60 need not be a low latency link and can be omitted altogether. If the direct connection 60 is omitted, the primary server 62 and the backup server 64 can be connected using the network 58. As another example of a variation, the direct connection 60 can be modified such that the primary server 62 and the backup server 64 are not directly connected, but instead connect via a relay device or hub.

The client machine 54 is not particularly limited and can be generally configured to be associated with an account. For example, in the present embodiment, the client machine 54 is associated with an account for electronic trading. In particular, the client machine 54 is configured to communicate with the primary server 62 and the backup server 64 for sending input messages to one or both of the primary server 62 and the backup server 64 as will be discussed in greater detail below. The client machine 54 is typically a computing device such as a personal computer having a keyboard and mouse (or other input devices), a monitor (or other output device) and a desktop-module connecting the keyboard, mouse and monitor and housing to one or more central processing units (CPU's), volatile memory (i.e. random access memory), non-volatile memory (i.e. hard disk devices) and network interfaces to allow the client machine 54 to communicate over the network 58. However, it is to be understood that client machine 54 can be any type of computing device capable of sending input messages over the network 58 to one or both of the primary server 62 and the backup server 64, such as a personal digital assistant, tablet computing device, cellular phone, laptop computer, etc.

In the present embodiment, the primary server 62 can be any type of computing device operable to receive and process input messages from the client machine 54, such as a HP ProLiant BL25p server from Hewlett-Packard Company, 800 South Taft, Loveland, Colo. 80537. Another type of computing device suitable for the primary server 62 is a HP DL380 G7 Server or a HP ProLiant DL560 Server also from Hewlett-Packard Company. Another type of computing device suitable for the primary server 62 is an IBM System x3650 M4. However, it is to be emphasized that these particular servers are merely examples, a vast array of other types of computing devices and environments for the primary server 62 and the backup server 64 are within the scope of the invention. The type of input message being received and processed by the primary server 62 is not particularly limited, but in a present embodiment, the primary server 62 operates as an on-line trading system, and is thus able to process input messages that include orders related to securities that can be traded on-line. For example, the orders can include an order to purchase or sell a security, such as a stock, or to cancel a previously placed order. More particularly in the present embodiment, the primary server 62 is configured to execute orders received from the client machine 54. The primary server 62 includes a gateway 68 and a trading engine 72 (also referred to as an order processing engine).

The gateway 68 is generally configured to receive and to handle messages received from other devices, such as the client machine 54 and the backup server 64 as well as process and send messages to other devices such as the client machine 54 and the backup server 64 in communication with the primary server 62. In the present embodiment, the gateway 68 includes a session manager 76, a dispatcher 80 and a verification engine 84.

The session manager 76 is generally configured to receive an input message from the client machine 54 via the network 58 and to send an output message to the client machine 54 via the network 58. It is to be understood that the manner by which the session manager 76 receives input messages is not particularly limited and a wide variety of different applications directed to on-line trading systems can be used.

The dispatcher 80 is generally configured to communicate with various resources (not shown) to obtain deterministic information and to assign a sequence number associated with the input message. It is to be appreciated with the benefit of this description that deterministic information can include any type of information used to maintain determinism and can include the sequence number associated with the input message. Furthermore, the dispatcher 80 is configured to dispatch the input message, the deterministic information, and the sequence number to the trading engine 72. The dispatcher 80 is further configured to dispatch or replicate the input message along with the deterministic information and the sequence number to the backup server 64. The deterministic information is not particularly limited and can include information from various sources to preserve determinism when the primary server 62 is processing a plurality of input messages received from the client machine 54 and/or additional client machines (not shown). For example, the dispatcher 80 can communicate with resources that are external to the processing of the input message but resident on the primary server 62, such as a timestamp from CPU clock (not shown). As another example, the dispatcher 80 can communicate with resources that are external to the primary server 62, such as a market feed (not shown) that maintains up-to-date information of market prices for various securities identified in a buy order or a sell order received from the client machine 54. Furthermore, the assignment of the sequence number is not particularly limited and variations are contemplated. For example, the dispatcher 80 can obtain a sequence number from a counter within the primary server 62 or another type of assigned identifier. Alternatively, the sequence number can be non-sequential or substituted with a non-numerical identifier. Therefore, it is to be appreciated that any identifier configured to identify the input message can be used.

The verification engine 84 is generally configured to receive an output message from the trading engine 72 and to receive a confirmation message 200 from the backup server 64. The output message is not particularly limit and generally includes a result of processing the input message from the trading engine 72. For example, when the input message is an order to purchase a share, the output message from the trading engine 72 can indicate whether the share has been purchased or whether the order for the purchase the share was unable to be filled in accordance with parameters identified in the input message. Similarly, when the input message is an order to sell a share, the output message from the trading engine 72 can indicate whether the share has been sold or whether the order to sell the share was unable to be filled in accordance with parameters identified in the input message.

The verification engine 84 is generally further configured to send a verification message 205 to the backup server 64 and to send the output message to the session manager 76 for subsequently sending to the client machine 54. In the present embodiment, the verification engine 84 is further configured to receive a confirmation message 200 from the backup server 64 to confirm that the input message along with the deterministic information has been received at the backup server 64. Therefore, the verification engine 84 can withhold the output message if the conformation message is not received.

It is to be appreciated that the manner by which the verification engine 84 operates is not particularly limited. For example, the verification message 205 is also not particularly limited and generally configured to provide the backup server 64 with the results from the trading engine 72 for comparison with results obtained by processing the input message at the backup server 64. In the present embodiment, the verification message 205 is an identical copy of the output message. However, in other embodiments, the verification message 205 can include more or less information. In other embodiments, the verification message 205 can include the numerical results whereas the output message can include additional metadata.

As another example of a variation, in the present embodiment, the verification engine 84 receives a confirmation message 200 from the backup server 64 indicating that the input message and associated deterministic information has been received at the backup server 64. However, it is to be appreciated, with the benefit of this description, that the confirmation message 200 is optional. For example, other embodiments can operate without confirming that the backup server 64 has received the input message and associated deterministic information. It is to be understood that not receiving a confirmation message 200 can reduce the number of operations carried out by the system 50. However, if confirmation messages 200 are not use, the primary server 62 may not be aware of a failure of the backup server 64 or the direct connection 60 without another error checking mechanism in place.

In general terms, the gateway 68 is generally configured to handle input and output messages to the primary server 62. However, it is to be re-emphasized that the structure described above is a non-limiting representation. For example, although the present embodiment shown in FIG. 2 shows the session manager 76, the dispatcher 80 and the verification engine 84 as separate modules within the primary server 62, it is to be appreciated that modifications are contemplated and that several different configurations are within the scope of the invention. For example, the session manager 76, the dispatcher 80 and the verification engine 84 can be separate processes carried out in a single gateway application running on one or more processors or processor cores (not shown) of the primary server 62. Alternatively, the session manager 76, the dispatcher 80 and the verification engine 84 can be running on separate processors or processor cores. In yet another embodiment, the primary server 62 can be a plurality of separate computing devices where each of the session manager 76, the dispatcher 80 and the verification engine 84 can be running on separate computing devices.

The trading engine 72 is generally configured process the input message along with deterministic information to generate an output message. In the present embodiment, the trading engine 72 includes a plurality of trading engine components 88-1, 88-2, 88-3, 88-4, and 88-5 (also referred to as engine components in general). In the present embodiment, each trading engine component 88-1, 88-2, 88-3, 88-4, or 88-5 is configured to process a separate input message type associated with the specific trading engine component. For example, the trading engine component 88-1 can be configured to process input messages relating to a first group of securities, such as securities related to a specific industry sector or securities within a predetermined range of alphabetically sorted ticker symbols, whereas the trading engine component 88-2 can be configured to process input messages relating to a second group of securities. Those skilled in the art will now appreciate that various input messages can be processed in parallel using corresponding trading engine components 88-1, 88-2, 88-3, 88-4, and 88-5 to provide multi-threading, where several parallel processes can occur simultaneously. Since the availability of each of the trading engine components 88-1, 88-2, 88-3, 88-4, and 88-5 can vary due to a number of conditions, the trading engine 72 can give rise to non-deterministic results such that the first input message received at the session manager 76 may not necessarily correspond to the first output message generated by the trading engine 72.

It is to be re-emphasized that the trading engine 72 described above is a non-limiting representation only. For example, although the present embodiment shown in FIG. 2 includes the trading engine 72 having trading engine components 88-1, 88-2, 88-3, 88-4, and 88-5, it is to be understood that the trading engine 72 can have more or less trading engine components. Furthermore, it is it is to be understood, with the benefit of this description, that trading engine components 88-1, 88-2, 88-3, 88-4, and 88-5 can be separate processes carried out by a single trading engine running on one or more shared processors or processor cores (not shown) of the primary server 62 or as separate processes carried out by separate processors or processor cores assigned to each trading engine components 88-1, 88-2, 88-3, 88-4, or 88-5. In yet another embodiment, the primary server 62 can be a plurality of separate computing devices where each of the trading engine components 88-1, 88-2, 88-3, 88-4, and 88-5 can be carried out on separate computing devices. As another example, the trading engine 72 can be modified to be a more general order processing engine for processing messages related to orders placed by a client. It is to be appreciated that in this alternative embodiment, the trading engine components 88-1, 88-2, 88-3, 88-4, or 88-5 are modified to be general engine components.

Similar to the primary server 62, the backup server 64 can be any type of computing device operable to receive and process input messages and deterministic information from the client machine 54. It is to be understood that the backup server 64 is not particularly limited to any machine and that several different types of computing devices are contemplated such as those contemplated for the primary server 62. The backup server 64 is configured to assume a primary role, normally assumed by the primary server 62, during a failover event and a backup role at other times. Accordingly, in the present example, the backup server 64 includes similar hardware and software as the primary server 62. However, in other embodiments, the backup server 64 can be a different type of computing device capable of carrying out similar operations. In the present embodiment, the backup server 64 includes a gateway 70 and a trading engine 74.

The type of input message being received and processed by the backup server 64 is not particularly limited. In a present embodiment, the backup server 64 is generally configured to operate in one of two roles: a backup role and a primary role. When the backup server 64 is operating in the backup role, the backup server 64 is configured to receive an input message, deterministic information, and a sequence number from the primary server 62. The backup server 64 then subsequently processes the input message using the deterministic information and the sequence number. For example, the input message can include an order to purchase or sell a share, or to cancel a previously placed order. It is to be appreciated that variations are contemplated. For example, the input received at the backup server 64 can include more or less data than the input message, the deterministic information and the sequence number. In particular, the sequence number can be omitted to conserve resources when the deterministic information is sufficient or when the sequence number is not needed.

When the backup server 64 is operating in the primary role, the backup server 64 is configured to carry out similar operations as the primary server 62 such as receive and process input messages from the client machine 54 directly. More particularly, in the present embodiment, the backup server 64 is configured switch between the primary role and the backup role dependent on whether a failover event exists.

The gateway 70 is similar to the gateway 68 and is generally configured to receive and to handle messages received from other devices, such as the client machine 54 and the primary server 62 as well as process and send messages to other devices such as the client machine 54 and the primary server 62. In the present embodiment, the gateway 70 includes a session manager 78, a dispatcher 82 and a verification engine 86.

The session manager 78 is generally inactive when the backup server 64 is operating in the backup role. During a failover event, the backup server 64 assumes a primary role and the session manager 78 can also assume an active role. In the primary role, the session manager 78 is configured to receive input messages directly from the client machine 54 via the network 58 and to send an output messages to the client machine 54 via the network 58. Similar to the session manager 76, it is to be understood that the manner by which the session manager 78 receives input messages is not particularly limited and a wide variety of different applications directed to on-line trading systems can be used.

When the backup server 64 is operating in the backup role, the dispatcher 82 is configured to receive the input message, the deterministic information, and the sequence number from the dispatcher 80 and to send a confirmation to the verification engine 84 of the primary server 62 in the present embodiment. When the backup server 64 is operating in the primary role, the dispatcher 82 is generally configured to carry out the similar operations as the dispatcher 80. In particular, the dispatcher 82 is configured to receive input messages from the client machine 54 and to communicate with various resources (not shown) to obtain deterministic information and to assign a sequence number when the backup server 64 is operating in the primary role.

It is to be appreciated, with the benefit of this description, that in both roles, the dispatcher 82 is configured to obtain input messages along with the associated deterministic information and the associated sequence number and to dispatch or replicate the input messages along with the associated deterministic information and the associated sequence number to the trading engine 74.

The verification engine 86 is generally configured to receive a backup output message from the trading engine 74. Similar to the output message generated by the trading engine 72, the backup output message is not particularly limit and generally includes a result of processing the input message from the trading engine 74 in accordance with the deterministic information. For example, when the input message is an order to purchase a share, the output message from the trading engine 74 can indicate whether the share has been purchased or whether the order for the purchase the share was unable to be filled. Similarly, when the input message is an order to sell a share, the output message from the trading engine 74 can indicate whether the share has been sold or whether the order to sell the share was unable to be filled.

When the backup server 64 is operating in the backup role, the verification engine 86 is also generally configured to receive the verification message 205 from the verification engine 84 of the primary server 62. In the present embodiment, the verification engine 86 uses the verification message 205 to verify that the output message generated by the primary server 62 agrees with the backup output message generated by the trading engine 74. It is to be appreciated that the manner by which the verification engine 86 carries out the verification is not particularly limited. In the present embodiment, the verification message 205 received at the verification engine 86 is identical to the output message generated by the trading engine 72 of the primary server 62. Accordingly, the verification engine 86 carries out a direct comparison of the contents of the verification message 205 with the backup output message to verify the output message of the primary server 62, which in turn verifies that both the primary server 62 and the backup server 64 generate the same results from the same input message and deterministic information. In other embodiments, the verification message 205 can be modified to include more or less information than the output message. For example, the verification message 205 can include the numerical results whereas the output message can include additional metadata. As another example, the verification message 205 can be modified to be a hash function, a checksum, or some other validation scheme.

In general terms, the gateway 70 is generally configured to handle input and output messages to the backup server 64. However, it is to be re-emphasized that the structure described above is a non-limiting representation. For example, although the present embodiment shown in FIG. 2 shows the session manager 78, the dispatcher 82 and the verification engine 86 as separate modules within the primary server 64, it is to be appreciated that modifications are contemplated and that several different configurations are within the scope of the invention. For example, the session manager 78, the dispatcher 82 and the verification engine 86 can be separate processes carried out in a single gateway application running on one or more processors or processor cores (not shown) of the backup server 64. Alternatively, the session manager 78, the dispatcher 82 and the verification engine 86 can be running on separate processors or processor cores. In yet another embodiment, the backup server 64 can be a plurality of separate computing devices where each of the session manager 78, the dispatcher 82 and the verification engine 86 can be running on separate computing devices.

The trading engine 74 is generally configured to process the input message along with deterministic information to generate an output message. In the present embodiment, the trading engine 74 includes a plurality of trading engine components 90-1, 90-2, 90-3, 90-4, and 90-5 similar to the trading engine 72. In the present embodiment, each trading engine component 90-1, 90-2, 90-3, 90-4, and 90-5 is configured to process a separate input message type. It is to be appreciated that the input message types of the trading engine 74 can also be referred to as backup message types since they can be similar to the input message types of the trading engine 72 or different. For example, the trading engine component 90-1 can be configured to process input messages relating to a first group of securities, such as securities related to a specific industry sector or securities within a predetermined range of alphabetically sorted ticker symbols, whereas the trading engine component 90-2 can be configured to process input messages relating to a second group of securities. Input message types may be different types and thus configured to communicate different data. Those skilled in the art will now appreciate that various input messages can be processed in parallel using corresponding trading engine components 90-1, 90-2, 90-3, 90-4, and 90-5 to provide multi-threading, where several parallel processes can occur simultaneously. Since the availability of each of the trading engine components 90-1, 90-2, 90-3, 90-4, and 90-5 can vary due to a number of conditions, the trading engine 74 can give rise to non-deterministic results such that the first input message received at the session manager 76 of the primary server 62, when the backup server 64 is operating in a backup role, may not necessarily correspond to the first output message generated by the trading engine 74.

It is to be re-emphasized that the trading engine 74 described above is a non-limiting representation only. For example, although the present embodiment shown in FIG. 2 includes the trading engine 74 having trading engine components 90-1, 90-2, 90-3, 90-4, and 90-5, it is to be understood that the trading engine 74 can have more or less trading engine components. Furthermore, it is it is to be understood, with the benefit of this description, that trading engine components 90-1, 90-2, 90-3, 90-4, and 90-5 can be separate processes carried out by a single trading engine running on one or more shared processors or processor cores (not shown) of the backup server 64 or as separate processes carried out by separate processors or processor cores assigned to each trading engine components 90-1, 90-2, 90-3, 90-4, or 90-5. In yet another embodiment, the backup server 64 can be a plurality of separate computing devices where each of the trading engine components 90-1, 90-2, 90-3, 90-4, and 90-5 can be carried out on a separate computing device.

Figure 3:
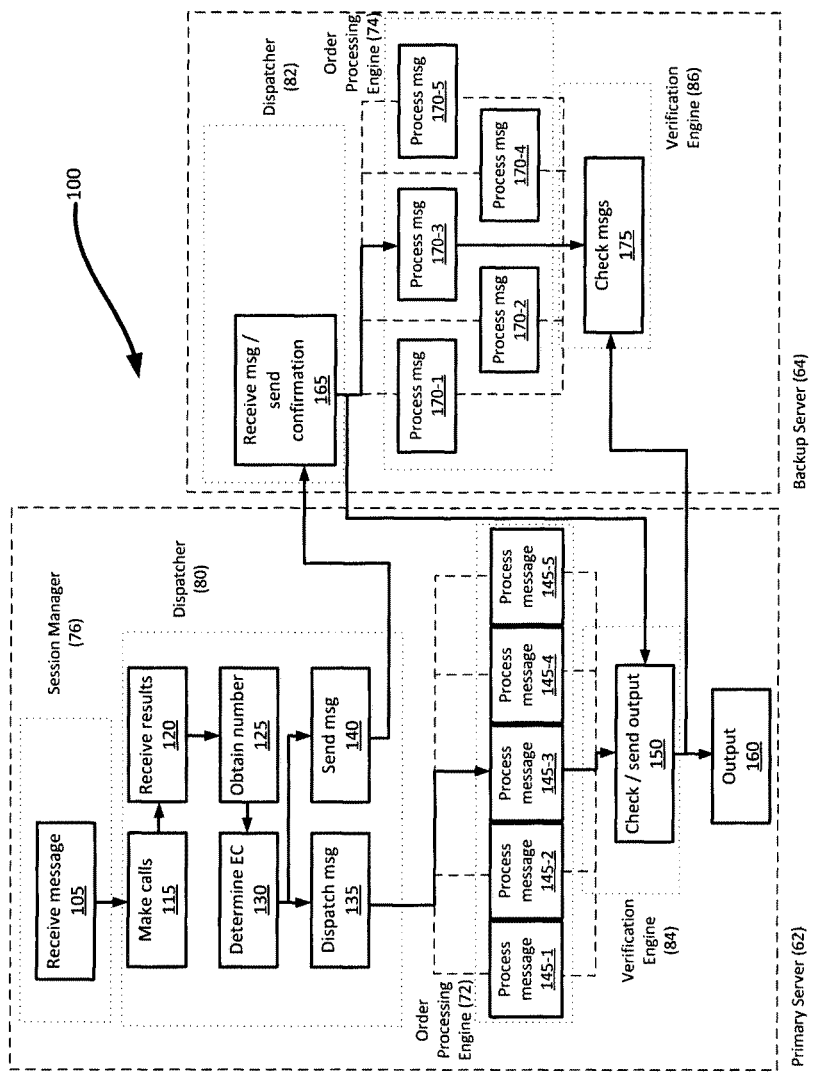
FIG. 3 is a flow chart of a method of failover in accordance with an embodiment.

Referring now to FIG. 3, a flowchart depicting a method for processing orders when the backup server 64 is operating in the backup role is indicated generally at 100. In order to assist in the explanation of the method, it will be assumed that method 100 is carried out using system 50 as shown in FIG. 2. Furthermore, the following discussion of method 100 will lead to further understanding of system 50 and its various components. For convenience, various process blocks of method 100 are indicated in FIG. 3 as occurring within certain components of system 50. Such indications are not to be construed in a limiting sense. It is to be understood, however, that system 50 and/or method 100 can be varied, and need not work as discussed herein in conjunction with each other, and the blocks in method 100 need not be performed in the order as shown. For example, various blocks can be performed in parallel rather than in sequence. Such variations are within the scope of the present invention. Such variations also apply to other methods and system diagrams discussed herein.

Figure 4:
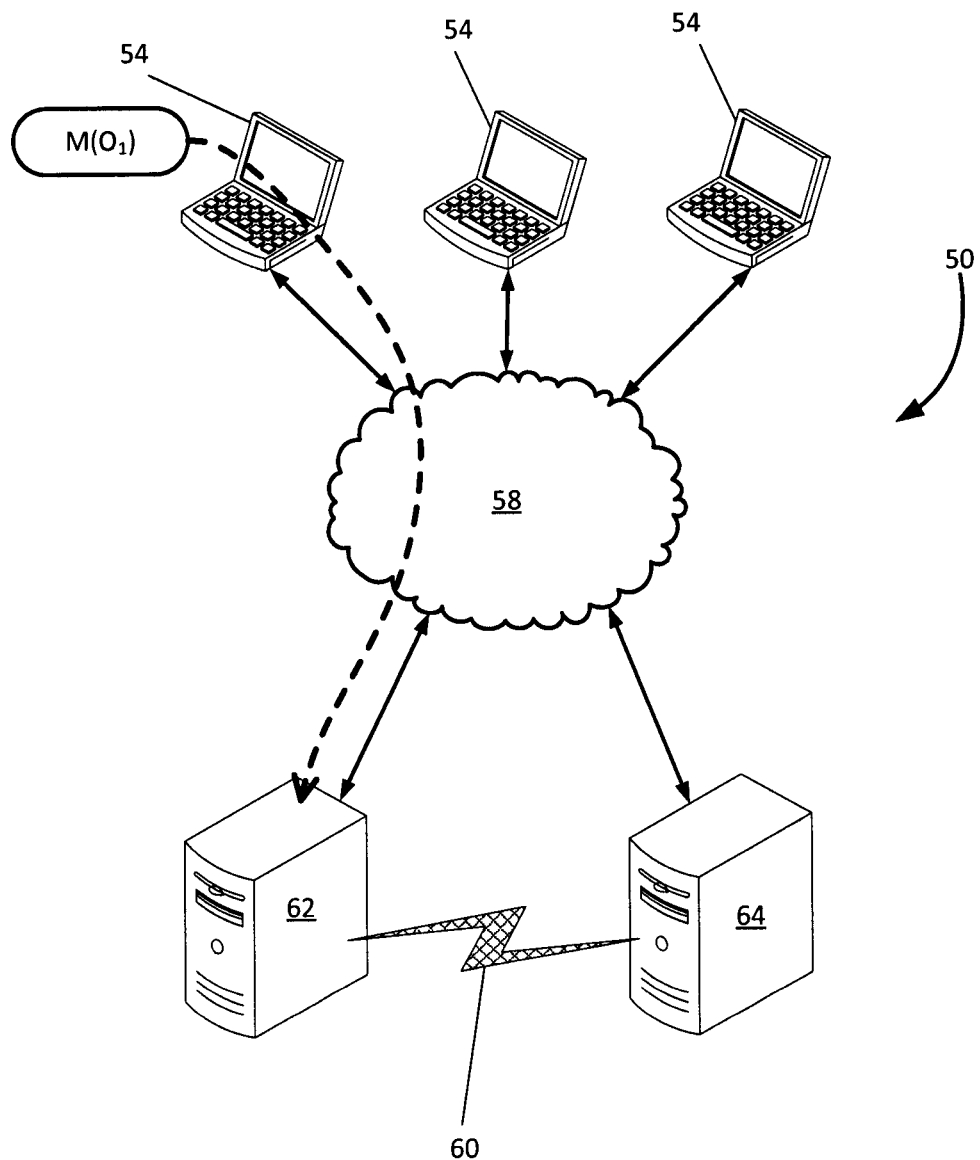
FIG. 4 is a schematic representation sending a message from a client machine to a primary server in a system in accordance with the embodiment shown in FIG. 1.

Block 105 comprises receiving an input message from the client machine 54. The type of input message is not particularly limited and is generally complementary to an expected type of input message for a service executing on the primary server 62. In the present embodiment, the input message can be a "buy order", "sell order", or "cancel order" for a share. Table I below provides an example of contents of an input message $M(O_1)$ having four fields received from the client machine 54 to buy shares. This exemplary performance of block 105 is shown in FIG. 4, as an input message $M(O_1)$ is shown as originating from client machine 54 and received at the primary server 62.

TABLE I

Message $M(O_1)$

| Field Number | Field Name | Example Contents |
|---|---|---|
| 1 | Trader | Trader T-1 |
| 2 | Security Name | ABC Co. |
| 3 | Transaction Type | Buy |
| 4 | Quantity | 1,000 units |

It is to be emphasized that the input message $M(O_1)$ of Table I is a non-limiting representation for illustrative purposes only. For example, although the input message $M(O_1)$ contains four fields as shown in Table I, it is to be understood that the input message $M(O_1)$ can include more or less fields. Furthermore, it is also to be understood that the information in the input message $M(O_1)$ is not particularly limited and that the input message $M(O_1)$ can include more or less data dependent on the characteristics of the system 50. In addition, the input message $M(O_1)$ need not be of a specific format and that various formats are contemplated. For example, in some embodiments, the primary server 62 can be configured to receive input messages, each having a different format. However, the example contents of Table I will be referred to hereafter to further the explanation of the present example.

Block 115 comprises making a call for external data associated with the input message $M(O_1)$ from the dispatcher 80. The external data is not particularly limited and can be utilized to further process the input message $M(O_1)$. In the present embodiment, the external data includes deterministic information that can be used to preserve determinism when processing the input message $M(O_1)$ on the primary server 62 and the backup server 64. The external data can include data received from services external to the system 50. For example, external data can include market feed data, banking data, or other third party data. Furthermore, it is to be appreciated, with the benefit of this description, that the external data does not necessarily require the data to originate from outside of the system 50. For example, the external data can also include a timestamp originating from one of the primary server 62 or the backup server 64.

In the present embodiment the dispatcher 80 makes an external call for a timestamp associated with the receipt of the input message $M(O_1)$ at the session manager 76 and a current market price for the security identified in field 2 of the order in message $M(O_1)$. The external call for a timestamp is sent to the CPU clock (not shown) of the primary server 62. The external call for a market price is sent to an external market feed service (not shown).

Block 120 comprises receiving, at the dispatcher 80, the result of the call from the operation of block 115. In the present embodiment the dispatcher 80 receives the timestamp associated with the receipt of the input message $M(O_1)$ from the CPU clock of the primary server 62 and a current market price for the security identified in field 2 of the order in message $M(O_1)$ from the external market feed service.

It is to be appreciated, with the benefit of this description, that the call for external data inherently renders the system 50 non-deterministic when carried out by the primary server 62 and the backup server 64 in parallel. Continuing with the present example where a call is made for a timestamp and a current market price, the non-deterministic nature naturally arises from the race conditions inherent to the system 50.

For example, the exact moment when the input message is received and the moment when the call is made for a timestamp is critical in order to ensure market fairness. It is unlikely that the primary server 62 and the backup server 64 can make a call for a timestamp at precisely the same time due to minor differences between the primary server 62 and the backup server 64 as well as synchronizing tolerances and lags introduced by communication between the primary server 62 and the backup server. Therefore, the primary server 62 and the backup server 64 can assign a different timestamp, resulting in potential differing outcomes.

Likewise, the exact moment when the input message is received and the call is made for a market price is also critical in order to ensure market fairness. This is especially true for securities trading with low volume or liquidity and where an order can significantly affect the price or availability of the share. Similar to the call for a timestamp, it is unlikely that that the primary server 62 and the backup server 64 make a call for a market price at exactly the same time. Therefore, that the primary server 62 and the backup server 64 can potentially have different market prices for the input message from the client machine 54. Accordingly, during a failover event, that the primary server 62 and the backup server 64 may not have consistent market data due to this non-deterministic nature.

Block 125 comprises using the dispatcher 80 for obtaining a sequence number associated with the input message $M(O_1)$. The manner by which the sequence number is obtained is not particularly limited and can involve making a call, similar to the operation of block 115, to an external counter. Alternatively, the dispatcher 80 can include an internal counter and assign a sequence number to the input message $M(O_1)$.

Block 130 comprises determining, at the dispatcher 80, to which of the plurality of trading engine components 88-1, 88-2, 88-3, 88-4, and 88-5 the input message $M(O_1)$, the associated deterministic information, and the associated sequence number are to be dispatched for processing. The manner by which the determination is made is not particularly limited and can involve performing various operations at the dispatcher 80. For example, if the plurality of trading engine components 88-1, 88-2, 88-3, 88-4, and 88-5 are configured to process a specific type of input message, the dispatcher 80 can determine which type of input message the input message $M(O_1)$ is and make the appropriate determination. For example, this determination can be made using the value stored in Field 2 of Table 1 and performing a comparison with lookup tables stored in a memory of the primary server 62. In other embodiments, the dispatcher 80 can make the determination dependent on the trading engine component 88-1, 88-2, 88-3, 88-4, or 88-5 having the highest availability. In other embodiments still, the method 100 can be modified such that the determination can be carried out by another device or process separate from the dispatcher 80 to reduce the demand of resources at the dispatcher 80.

In the present example, the dispatcher 80 has determined that the input message $M(O_1)$ is to be processed using the trading engine component 88-3. After determining which of the trading engine components 88-1, 88-2, 88-3, 88-4, and 88-5, the method 100 moves on to blocks 135 and 140.

Those skilled in the art will now appreciate that as various input messages are processed using a corresponding trading engine components 88-1, 88-2, 88-3, 88-4, and 88-5 to provide multi-threading, where several parallel processing processes can occur simultaneously to introduce further non-determinism into the system 50. For example, the availability of each trading engine components 88-1, 88-2, 88-3, 88-4, and 88-5 can vary due to a number of conditions such that the trading engine 72 can give rise to non-deterministic results. As another example, each of the trading engine components 88-1, 88-2, 88-3, 88-4, and 88-5 can be inherently slower as a result of the type of input message received at the specific trading engine component 88-1, 88-2, 88-3, 88-4, or 88-5. Accordingly, it is to be appreciated, with the benefit of this description, that the first input message received at the session manager 76 may not necessarily correspond to the first output message generated by the trading engine 72.

Block 135 comprises dispatching the input message $M(O_1)$, the associated deterministic information, and the associated sequence number from the dispatcher 80 to the trading engine 72. In the present embodiment, the deterministic information and the sequence number are also dispatched. The manner by which the input message $M(O_1)$, the deterministic information, and the sequence number are dispatched is not particularly limited and can involve various manners by which messages are transmitted between various components or processes of the primary server 62. In the present embodiment, a plurality of trading engine component processes 145-1, 145-2, 145-3, 145-4, and 145-5 are carried out by the plurality of trading engine components 88-1, 88-2, 88-3, 88-4, and 88-5, respectively. Since the input message $M(O_1)$ of the present example was determined at block 130 to be processed by the trading engine component 88-3, the input message $M(O_1)$, the deterministic information, and the sequence number cause the method 100 to advance to block 145-3.

Table II shows exemplary data dispatched from the dispatcher 80 to the trading engine 72 associated with the input message $M(O_1)$:

TABLE II

Exemplary Data Dispatched in Block 135

| Record Number | Field Number | Field Name | Example Contents |
|---|---|---|---|
| 1 | 1 | Message | $M(O_1)$ |
| 1 | 2 | Timestamp | 12:00 PM, Jan. 5, 2000 |
| 1 | 3 | Market Price | $2.00 |
| 1 | 4 | Sequence | 1 |

TABLE II-continued

Exemplary Data Dispatched in Block 135

| Record Number | Field Number | Field Name | Example Contents |
|---|---|---|---|
| 1 | 5 | Number Trading Engine Component | 88-3 |

Figure 5:
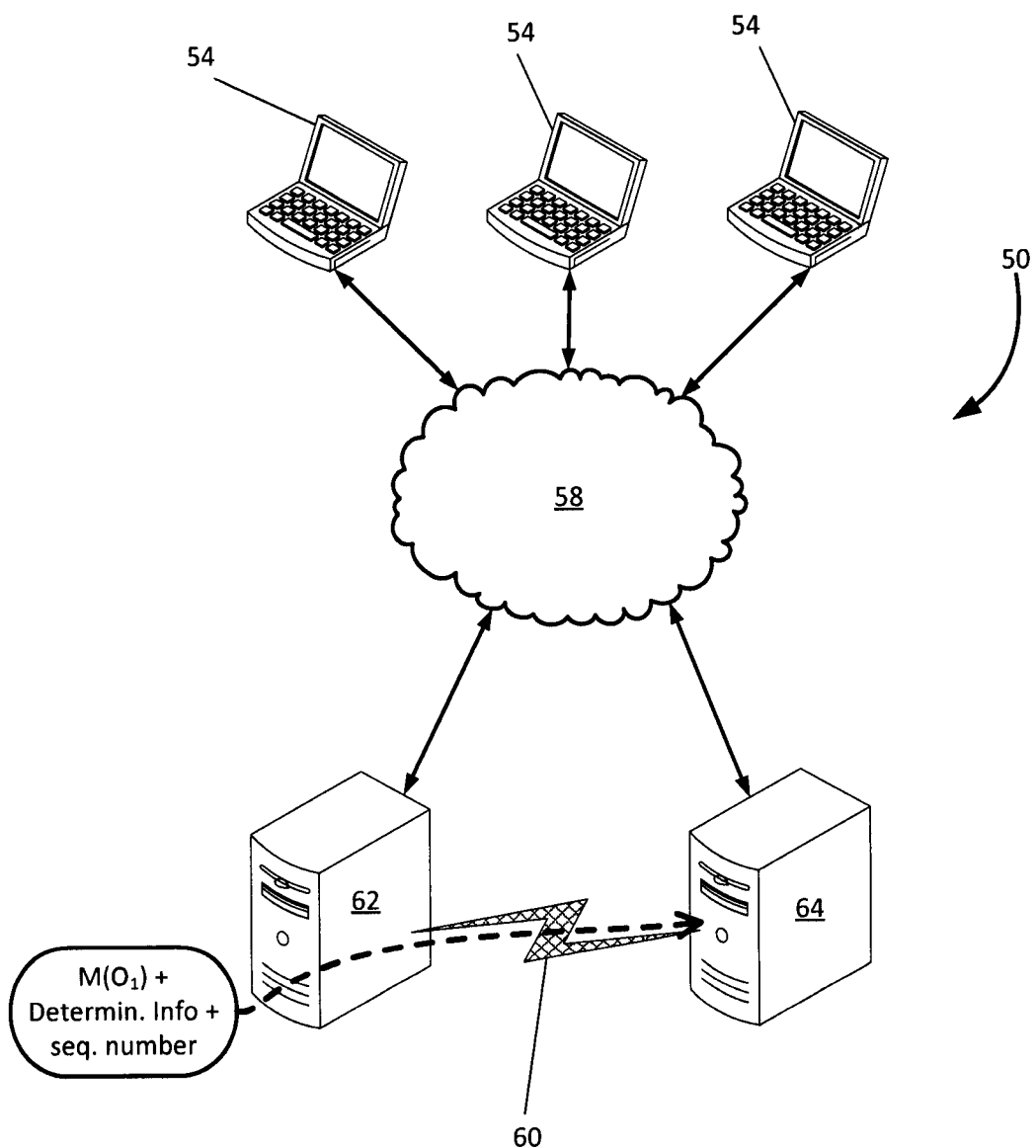
FIG. 5 is a schematic representation sending a message from a primary server to a backup server in a system in accordance with the embodiment shown in FIG. 1.

Block 140 comprises dispatching or replicating the input message $M(O_1)$, the deterministic information, and the sequence number from the dispatcher 80 to the backup server 64. The manner by which the input message $M(O_1)$, the deterministic information, and the sequence number are dispatched or replicated is not particularly limited and can involve various manners by which messages are transmitted between servers. In the present embodiment, the data is dispatched or replicated via the direct connection 60. This exemplary performance of block 140 is shown in FIG. 5, as an input message $M(O_1)$, the deterministic information, and the sequence number is shown as originating from the primary server 62 and received at the backup server 64 via the direct connection 60.

Table III shows exemplary data dispatched or replicated from the dispatcher 80 to the backup server 64 associated with the input message $M(O_1)$:

TABLE III

Exemplary Data Dispatched or Replicated in Block 140

| Record Number | Field Number | Field Name | Example Contents |
|---|---|---|---|
| 1 | 1 | Message | $M(O_1)$ |
| 1 | 2 | Timestamp | 12:00 PM, Jan. 5, 2000 |
| 1 | 3 | Market Price | $2.00 |
| 1 | 4 | Sequence Number | 1 |
| 1 | 5 | Trading Engine Component | 88-3 |

Although the entire message $M(O_1)$ along with the deterministic information and the sequence number is dispatched or replicated to the backup server 64 in the present embodiment as shown in Table III, variations are contemplated. In other embodiments, the input message $M(O_1)$ can contain more or less information. For example, the value stored in Field Number 1 of Table I can be omitted. As another example, the input message $M(O_1)$ can include further data associated with the data transfer itself such as an additional timestamp or status flag. Furthermore, the result of the determination made in block 130 can be omitted from being sent to the backup server. However, it is to be appreciated, with the benefit of this description, that in embodiments where the determination is not sent, a similar determination can be made at the backup server 64.

Blocks 145-1, 145-2, 145-3, 145-4, and 145-5 comprise processing a message at the trading engine components 88-1, 88-2, 88-3, 88-4, and 88-5, respectively. In the present example of the input message $M(O_1)$, block 145-3 is carried out by the trading engine component 88-3 to process the order for 1000 shares of ABC Co. Block 145-3 is carried out using an order placement service where a buy order is generated on the market. After carrying out the operations of block 145-3, the trading engine component 88-3 generates an output message for sending to the verification engine 84 and advances to block 150.

Block 150 comprises sending a verification message 205 from the verification engine 84 to the backup server 64 and sending the output message to the session manager 76 for ultimately sending back to the client machine 54 from which the input message $M(O_1)$ was received. The verification message 205 is not particularly limited and will be discussed further below in connection with the verification engine 86 of the backup server. This exemplary performance of block 150 is shown in FIG. 5, as verification message 205 is shown as originating from the primary server 62 and received at the backup server 64 via the direct connection 60.

In the present embodiment, block 150 further comprises checking that a confirmation message 200 associated with the input message $M(O_1)$ has been received from the backup server 64. It is to be appreciated, with the benefit of this description, that this optional confirmation message 200 provides an additional mechanism to ensure that the backup server is operating normally to receive the input message $M(O_1)$. Therefore, in the present embodiment, block 150 will wait until the confirmation message 200 has been received before sending the output message to the session manager 76. However, in other embodiments, block 150 can be modified such that the verification engine 84 need not actually wait for the confirmation message 200 before proceeding on to block 160. It is to be appreciated that in embodiments where block 150 need not wait for the confirmation message 200, block 150 can still expect a confirmation message 200 such that if no confirmation message 200 is received within a predetermined period of time, the primary server 62 becomes alerted to a failure of the backup server 64. In another embodiment, it is to be appreciated that the confirmation message 200 can be omitted to reduce the amount of resources required at the primary server 62 as well as the amount of data sent between the primary server 62 and the backup server 64.

Block 160 comprises sending the output message from the session manager 76 back to the client machine 54 from which the input message $M(O_1)$ originated. The manner by which the output message is sent is not particularly limited and can include using similar communication methods used to receive the input message $M(O_1)$. For example, the session manager need not send the output message to the client machine 54 and can instead send the output message to another device.

Referring again to FIG. 3, blocks 170-1, 170-2, 170-3, 170-4, and 170-5 are generally inactive when the backup server 64 is operating in the backup role. Blocks 170-1, 170-2, 170-3, 170-4, and 170-5 carry out similar functions to blocks 145-1, 145-2, 145-3, 145-4, and 145-5, respectively, as described above when the backup server 64 is operating in the primary role.

Figure 6:
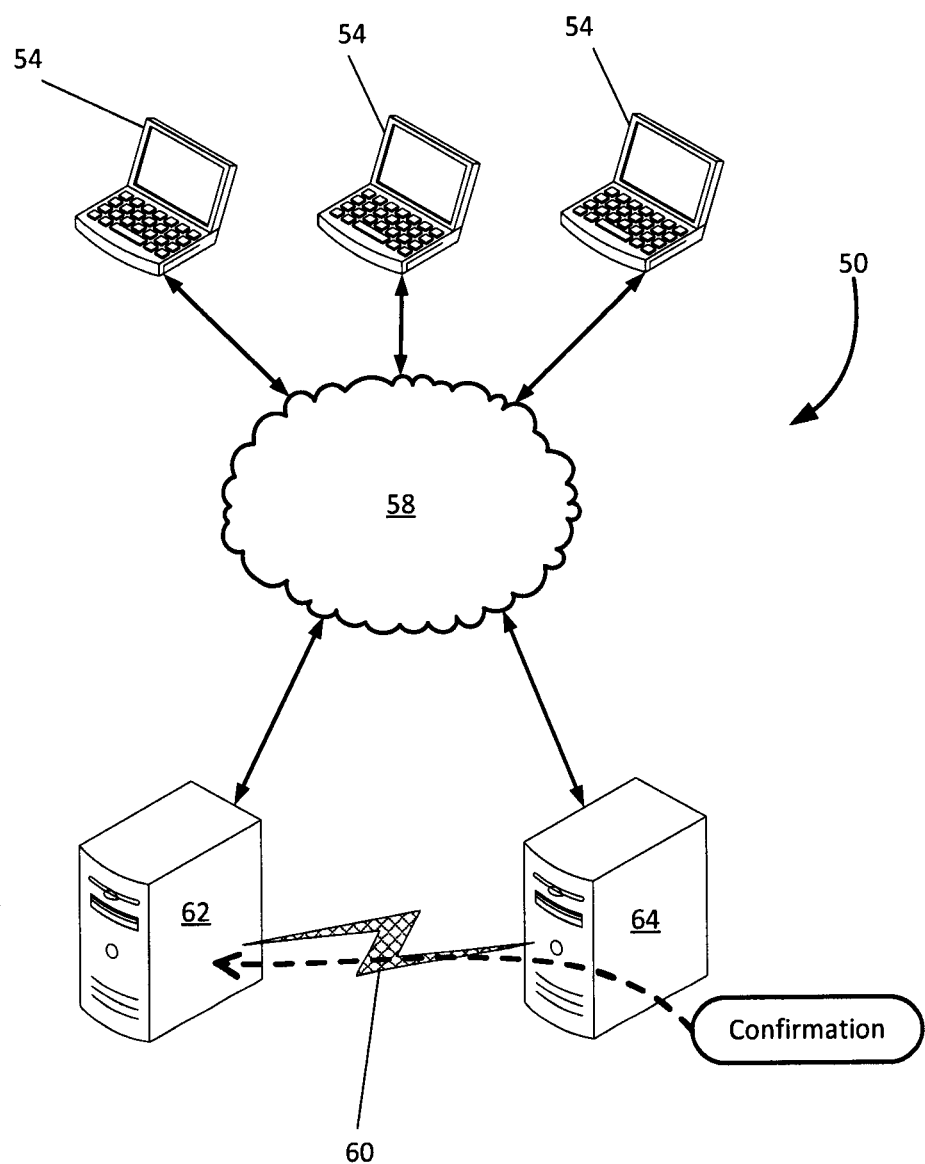
FIG. 6 is a schematic representation sending a confirmation from a backup server to a primary server in a system in accordance with the embodiment shown in FIG. 1.
Figure 7:
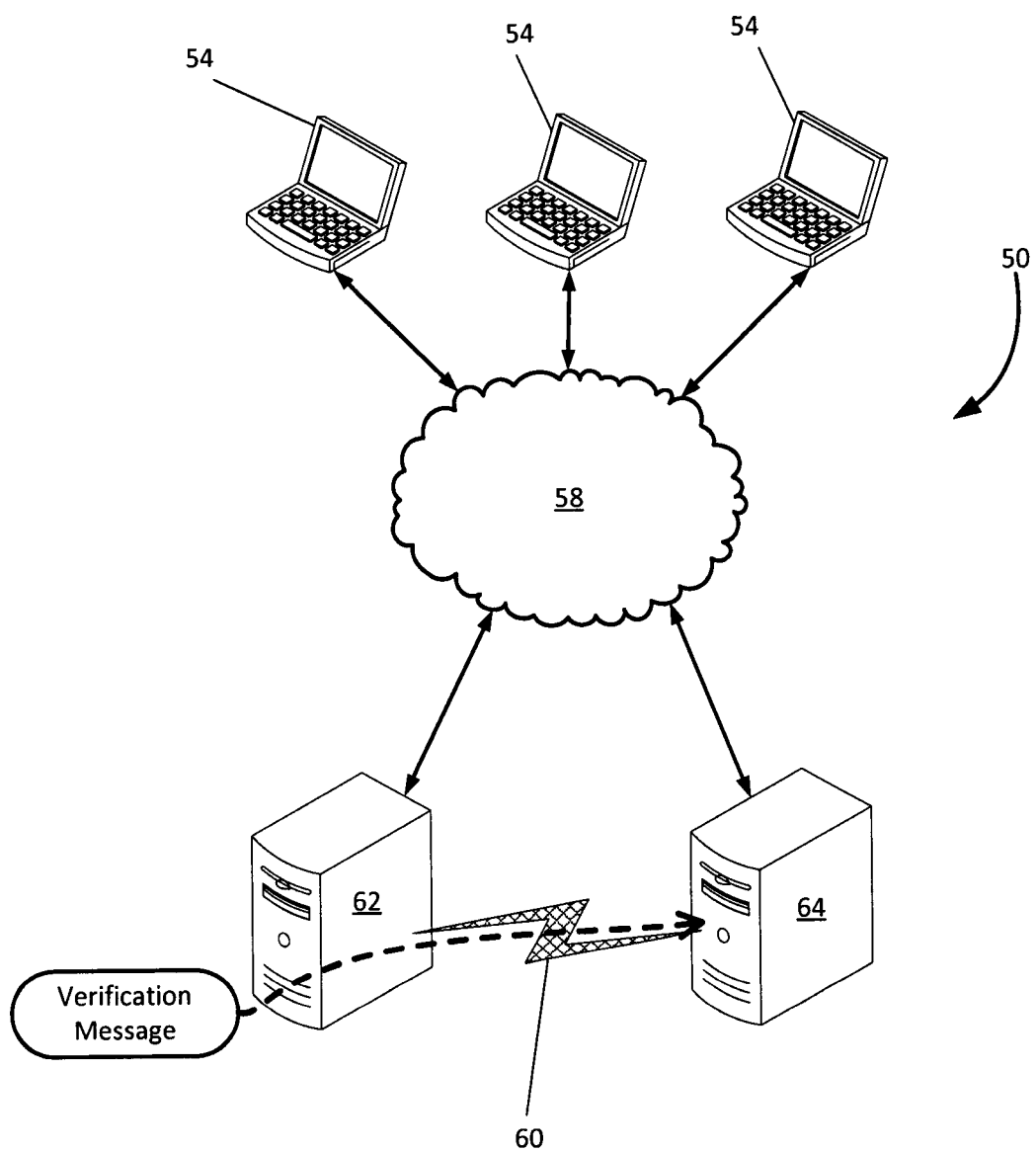
FIG. 7 is a schematic representation sending a verification message from a primary server to a backup server in a system in accordance with the embodiment shown in FIG. 1.

Block 165 comprises receiving the input message $M(O_1)$, the deterministic information, and the sequence number at the dispatcher 82 of the backup system 64 from the dispatcher 80 of the primary server 62. Continuing with the example above, block 165 also optionally receives the determination made at block 130 in the present embodiment. Furthermore, block 165 also optionally sends a confirmation message 200 from the dispatcher 82 back to primary server 62 to indicate that the input message $M(O_1)$, the deterministic information, and/or the sequence number have been safely received at the backup server. This optional performance of block 165 involving sending the confirmation message 200 is shown in FIG. 6, as the confirmation message 200 is shown as originating from the backup server 64 and received at the primary server 62 via the direct connection 60. It is to be appreciated, with the benefit of this description, that the primary server 62 and the backup server 64 are similar such that the determination made at block 130 can be applied to both the primary server 62 and the backup server 64. In other embodiments where the primary server 62 and the backup server 64 cannot use the same determination made at block 130, a separate determination can be carried out.

Block 165 comprises dispatching or replicating the input message $M(O_1)$, the deterministic information, and the sequence number from the dispatcher 82 to the trading engine 74. The manner by which the data chunk is sent is not particularly limited and can include similar methods as those described above in block 135. In particular, the data dispatched or replicated can be the same data as shown in Table II.

Blocks 170-1, 170-2, 170-3, 170-4, and 170-5 each comprise processing a message at the trading engine components 90-1, 90-2, 90-3, 90-4, and 90-5, respectively. In the present embodiment, the primary server 62 and the backup server are structurally equivalent. Accordingly, blocks 170-1, 170-2, 170-3, 170-4, and 170-5 carry out the same operations as blocks 145-1, 145-2, 145-3, 145-4, and 145-5, respectively. Therefore, in the present example of the input message $M(O_1)$, block 170-3 is used to process the input message $M(O_1)$ and is carried out by the trading engine component 90-3 to process the order for 1000 shares of ABC Co. The manner in which the input message $M(O_1)$ is processed is not particularly limited and can include similar methods as those described above in block 145-3. After carrying out the operations of block 170-3, the trading engine component 90-3 generates an output message for sending to the verification engine 86 and advances to block 175.

Block 175 comprises receiving and comparing the verification message 205 from the primary server 62 at the verification engine 86. Continuing with the present example of the present embodiment, block 175 compares the verification message 205 from the primary server 62 with the output message generated at block 170-3. The manner by which the verification message 205 is compare with the output message generated at block 170-3 is not particularly limited and can include various checksum or validation operations to verify the integrity results when processed independently by the primary server 62 and the backup server 64. For example, in the present embodiment, the verification message 205 can be a copy of the output message generated by the trading engine 72. The verification engine 86 can then carry out a direct comparison between the verification message 205 and the output message generated by the trading engine 74. In other embodiments, less data can be included in the verification message 205 to conserve resources.

It is to be re-emphasized that the method 100 described above is a non-limiting representation. For example, the variants discussed above can be combined with other variants.

Figure 8:
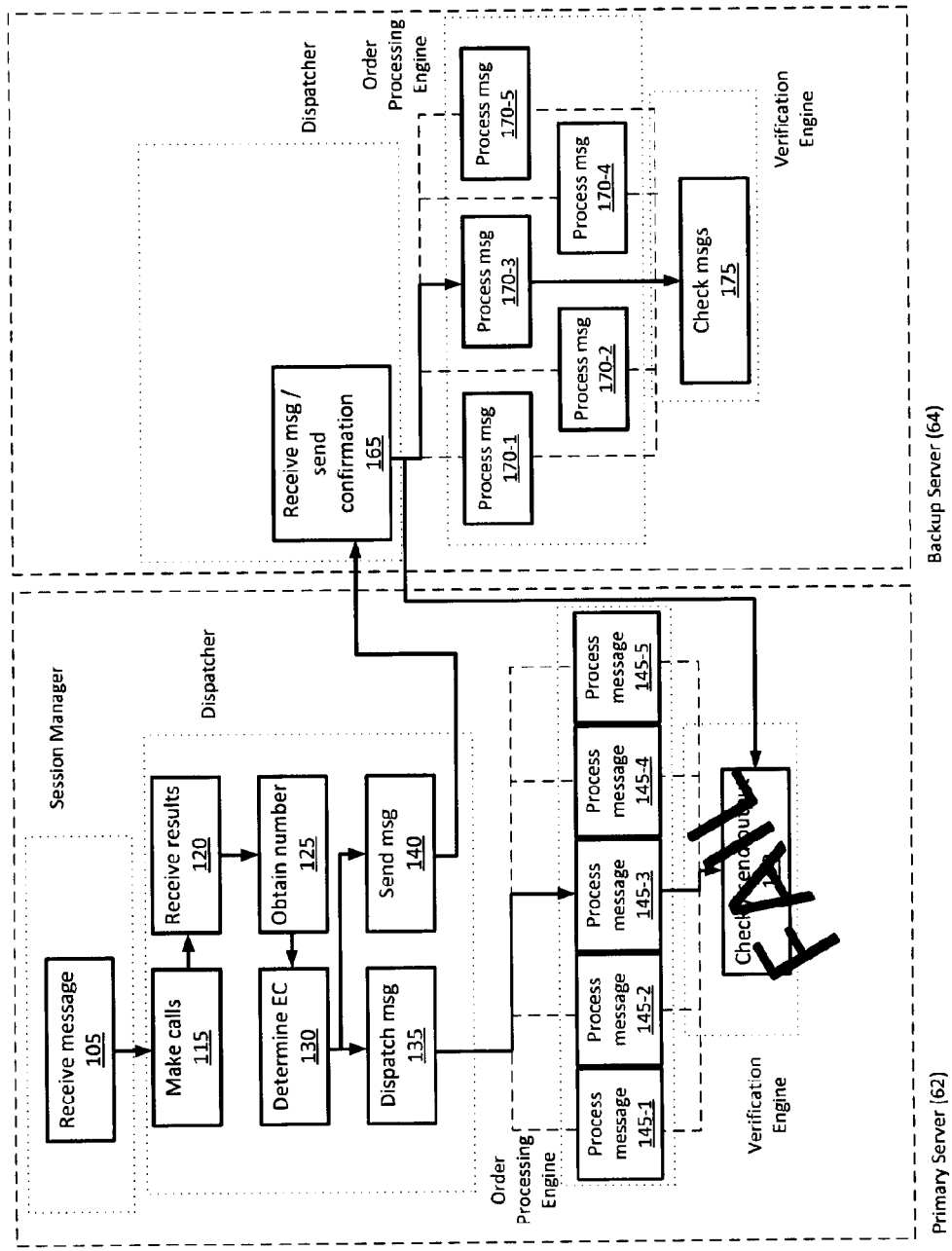
FIG. 8 is a flow chart of a method of failover in accordance with an embodiment in accordance with the embodiment of FIG. 3 during a failure.
Figure 9:
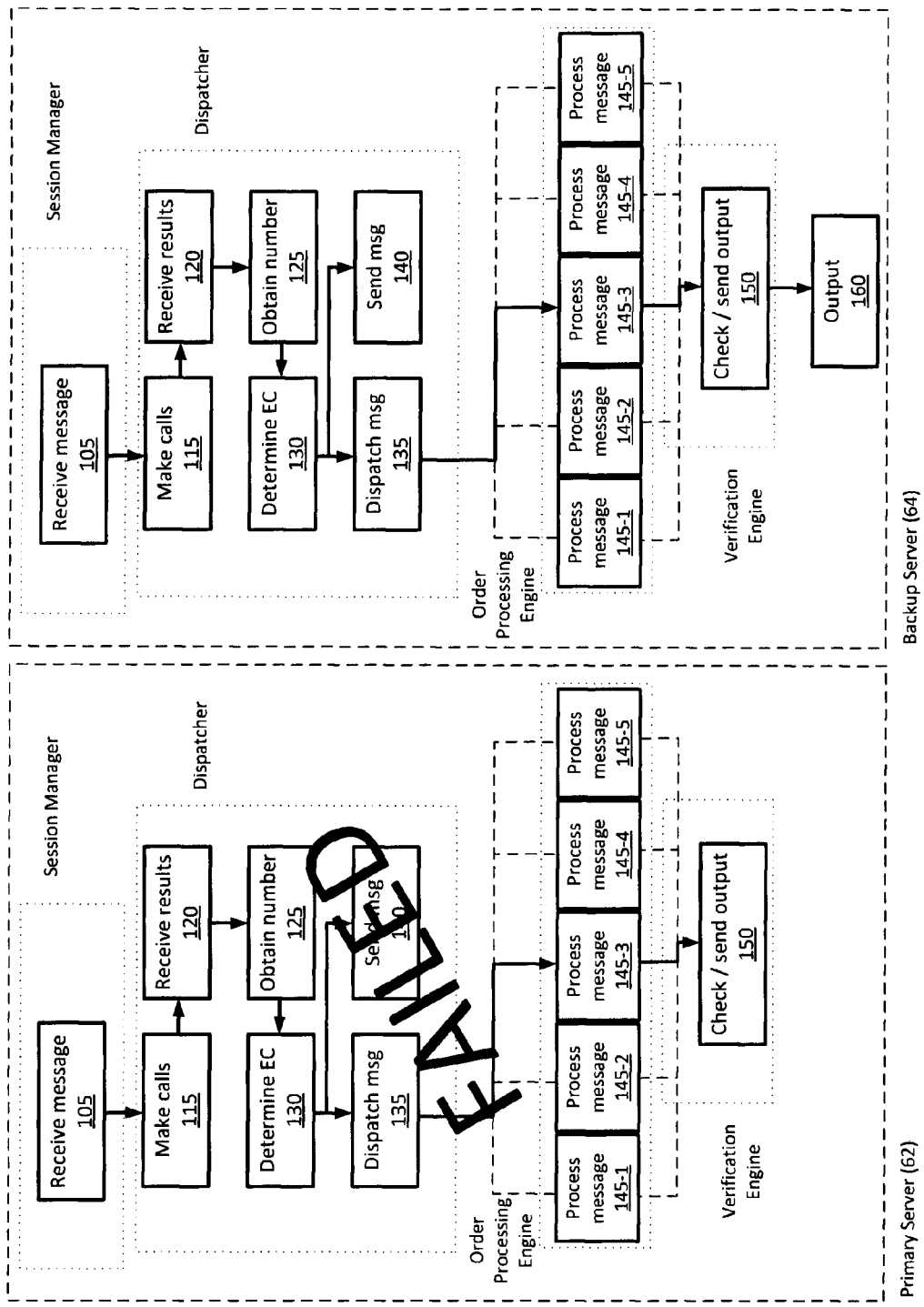
FIG. 9 is a flow chart of a method of failover in accordance with an embodiment in accordance with the embodiment of FIG. 3 after a failure.

Referring to FIG. 8, an exemplary failure of the verification engine 84 of the primary server 62 is shown. The exemplary failure prevents block 160 from being executed and thus the backup server 64 fails to receive the verification message 205 from the primary server 62. Upon recognizing that the primary server 62 has experienced a failure, the backup server 64 switched from operating in the backup role to operating in the primary role as shown in FIG. 9. The manner by which the backup server 64 switches from the backup role to the primary role is not particularly limited. For example, the primary server 62 and the backup server 64 can each include stored instructions to carry out a failover protocol operating in the verification engines 84 and 86, respectively.

The failover protocol of the primary server 62 can communicate with the failover protocol of the backup server 64 monitor the system 50 for failures. The failover protocol can use the results of the comparison carried out in block 175 as an indicator of the system 50. It is to be appreciated, with the benefit of this description, that a failure need not necessarily occur in the primary server 62 and that a wide variety of failures can affect the performance of the system 50. For example, a failure in the direct connection 60 between the primary server 62 and the backup server 64 and a failure of the communication hardware in the backup server 64 can also disrupt the verification message 205. Therefore, in other embodiments, the failover protocol can be configured to detect the type of failure to determine whether the backup server 64 is to be switched to a primary role. In further embodiments, the failover protocol can also include communicating period status check messages between the primary server 62 and the backup server 64.

The manner by which the backup server switches from the backup mode to the primary mode is not particularly limited. In the present embodiment, the backup server 64 activates the session manager 78 and sends a message to the client machine 54 to inform the client machine 54 that the backup server 64 has switched to a primary role such that future input messages are received at the session manager 78 instead of the session manager 76. In addition, the dispatcher 82 activates processes of blocks 170-1, 170-2, 170-3, 170-4, and 170-5. In other embodiments, an external relay can be used to communicate with the client machine 54 and automatically direct the input message to the correct server without informing the client machine 54 that a failover event has occurred.

Furthermore, it is to be appreciated that in the event the primary server 62 fails, the failover protocol can request an input message to be resent from the client machine 54. If the dispatcher 80 of the primary server 62 experiences a failure prior to carrying out the operation of block 140, the input message can be lost. Accordingly, the failover protocol can be generally configured to request at least some of the input messages be resent. Therefore, the backup server 64 can receive a duplicate input message from the client machine 54 when switching from the backup role to the primary role. For example, if the backup server is processing the input message $M(O_1)$ and the client machine re-sends the input message $M(O_1)$ due to the failover event, the backup server 64 can process the same input message twice. It is to be appreciated that the potential duplicate message can be handled using an optional gap recovery protocol to reduce redundancy.

The gap recovery protocol is generally configured to recognize duplicate messages and simply return the same response if already processed at the backup server 64, without attempting to reprocess the same message. The exact manner by which the gap recovery protocol is configured is not particularly limited. For example, the gap recovery protocol can compare the fields of the input message to determine if a similar input message were to be received from the primary server 62. In the event the input message and deterministic information was received from the primary server 62, the gap recovery protocol will use the output message generated by the trading engine 74. In the event that the input message was not received from the primary server 62, the backup server 64 follows the method shown in FIG. 9 to process the message.

Figure 10:
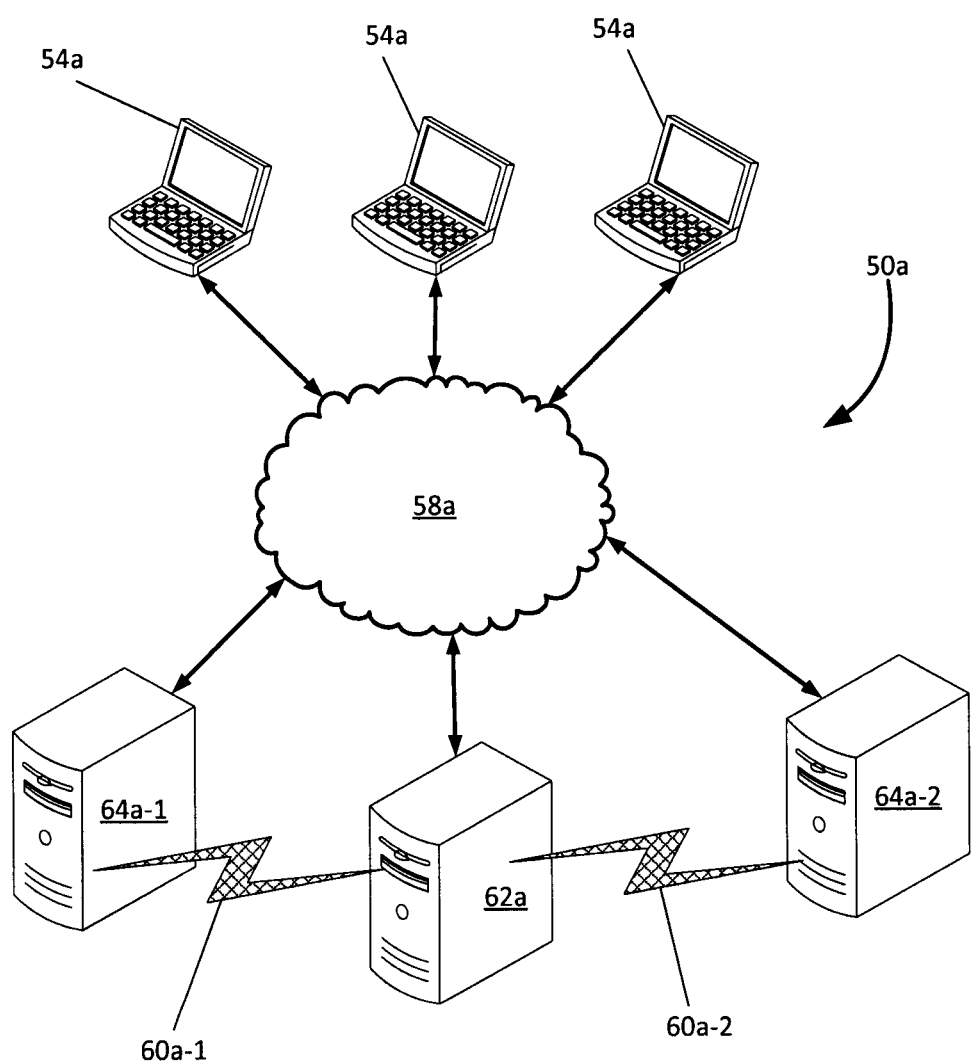
FIG. 10 is a schematic representation of a failover system in accordance with another embodiment.

Referring to FIG. 10, another embodiment of a system for failover is indicated generally at 50a. Like components of the system 50a bear like reference to their counterparts in the system 50, except followed by the suffix "a". The system 50a includes a client machine 54a connected to a network 58a. The network 58a is connected to a primary server 62a, a first backup server 64a-1 and a second backup server 64a-2. Accordingly, the client machine 54a can communicate with primary server 62a and/or the backup servers 64a-1 and 64a-2 via the network 58a.

In the present embodiment, the primary server 62a communicates with both the backup servers 64a-1 and 64a-2 as shown in FIG. 10 via direct connections 60a-1 and 60a-2. The input message, the deterministic information, and the sequence number from the dispatcher 80a to both backup servers 64a-1 and 64a-2. Similarly, the verification message 205 is also sent to both backup servers 64a-1 and 64a-2. It is to be appreciated that in the event of a failure of the primary server 62a, one of the backup servers 64a-1 and 64a-2 can switch from operating in a backup role to operating in a primary role. It is to be appreciated, with the benefit of this description, that when the primary server 62a fails and one of the backup servers 64a-1 and 64a-2 switches to the primary role, the system 50a effectively switches to a system similar to the system 50.

Figure 11:
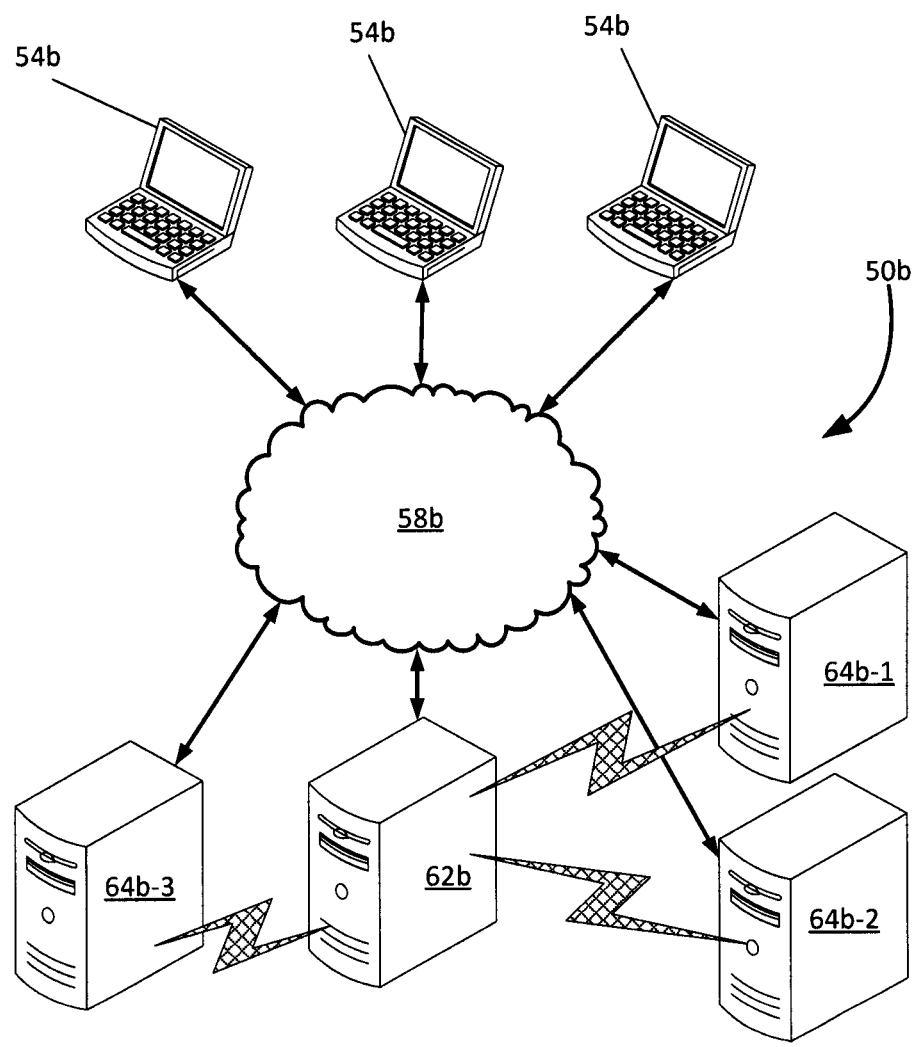
FIG. 11 is a schematic representation of a failover system in accordance with another embodiment.

Referring to FIG. 11, embodiment of a system for failover is indicated generally at 50b. Like components of the system 50b bear like reference to their counterparts in the system 50, except followed by the suffix "b". The system 50b includes a client machine 54b connected to a network 58b. The network 58b is connected to a primary server 62b, a first backup server 64b-1, a second backup server 64b-2, and a third backup server 64b-3. Accordingly, the client machine 54b can communicate with primary server 62b and/or the backup servers 64b-1, 64b-2, and 64b-3 via the network 58b.

It is to be appreciated that when verification messages 205 are send to a plurality of backup servers for comparison, the results of the comparison can be further compared. For example, a failover protocol can require unanimous results among the plurality of backup servers 64b-1, 64b-2, and 64b-3 before determining that a failure has occurred. Alternatively, the failover protocol can require a majority of the results among the plurality of backup servers 64b-1, 64b-2, and 64b-3 before determining that a failure has occurred Variations are contemplated. For example, although the present embodiment shown in FIG. 10 includes three backup servers 64b-1, 64b-2, and 64b-3, the system 50b can include more or less than three servers. It is to be appreciated that by adding more server to the system 50b, the amount of redundancy and failover protection increases. However, each additional server increases the complexity and resources for operating the failover system.

Figure 12:
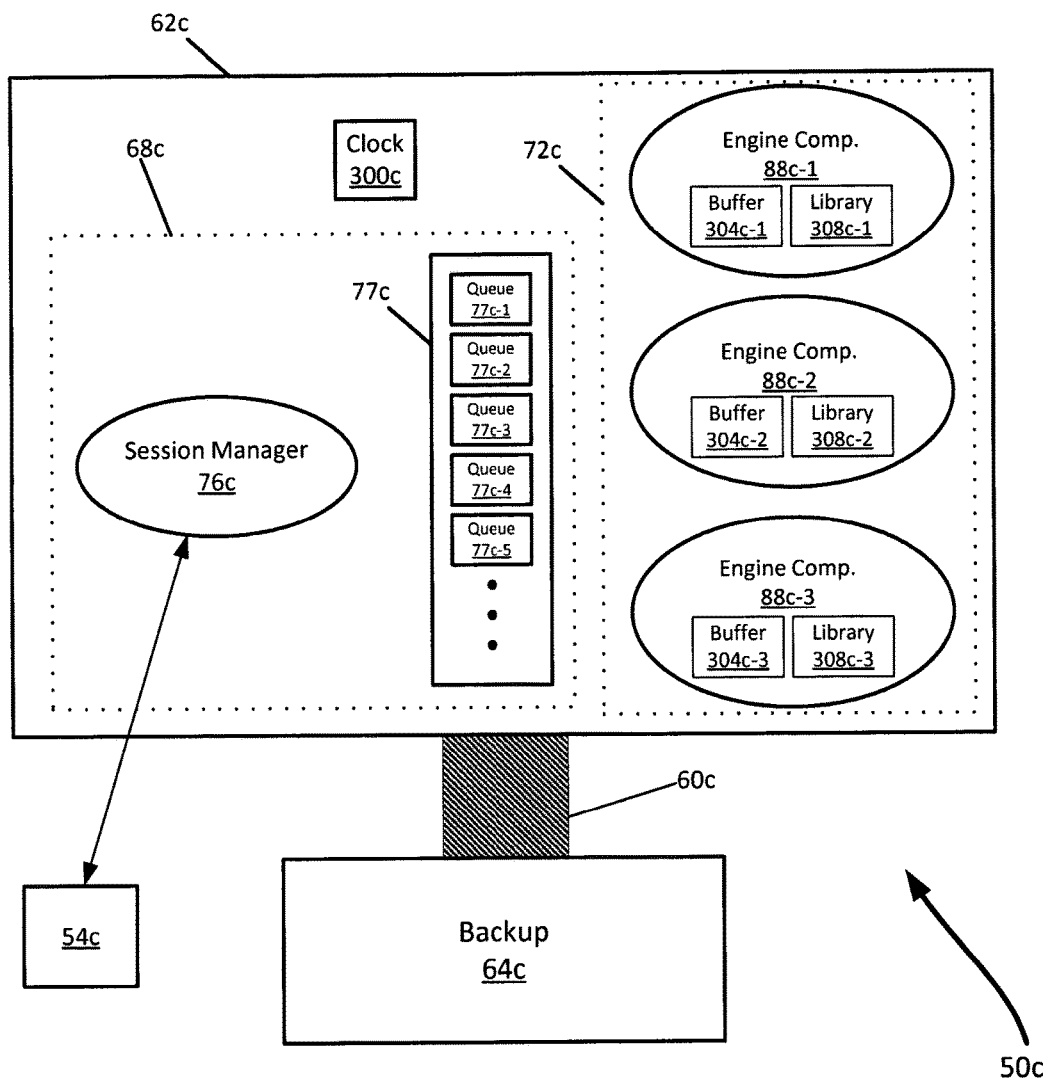
FIG. 12 is a schematic representation of a first and second server in accordance in accordance with another embodiment.

Referring to FIG. 12, a schematic block diagram of another embodiment of a system for failover is indicated generally at 50c. Like components of the system 50c bear like reference to their counterparts in the system 50, except followed by the suffix "c". The system 50c includes a client machine 54c, a primary server 62c, and a backup server 64c. In the present embodiment, a direct connection 60c connects the primary server 62c and the backup server 64c. The direct connection 60c is not particularly limited and can include various types of connections including those discuss above in connection with other embodiments.

In the present embodiment, the primary server 62c can be any type of computing device operable to receive and process input messages from the client machine 54c, such as those discussed above in connection with other embodiments. Similar to the primary server 62, the primary server 62c of the present embodiment operates as an on-line trading system, and is thus able to process input messages that include orders related to securities that can be traded on-line. For example, the orders can include an order to purchase or sell a share, or to cancel a previously placed order. More particularly in the present embodiment, the primary server 62c is configured to execute orders received from the client machine 54c. The primary server 62c includes a gateway 68c, an order processing engine 72c, and a clock 300c.

Similar to the embodiment described above, the gateway 68c is generally configured to receive and to handle messages received from other devices, such as the client machine 54c as well as process and send messages to other devices such as the client machine 54c in communication with the primary server 62c. In the present embodiment, the gateway 68c includes a session manager 76c, and a memory storage 77c.

The session manager 76c is generally configured to receive an input message from the client machine 54c via a network and to send an output message to the client machine 54c via the network. It is to be understood that the manner by which the session manager 76c receives input messages is not particularly limited and a wide variety of different applications directed to on-line trading systems can be used.

The memory storage 77c is generally configured to maintain a plurality of queues 77c-1, 77c-2, 77c-3, 77c-4, and 77c-5. In the present embodiment, the plurality of queues 77c-1, 77c-2, 77c-3, 77c-4, and 77c-5 are generally configured to queue messages that are to be sent to the order processing engine 72c for processing. It is to be understood, with the benefit of this description, that a component of the order processing engine 72c may be occupied processing a message. Accordingly, the input message must be stored in the memory storage 77c until the order processing engine 72c can accept the input message.

It is to be re-emphasized that the memory storage 77c described herein is a non-limiting representation. For example, although the present embodiment shown in FIG. 12 includes the memory storage 77c having the plurality of queues 77c-1, 77c-2, 77c-3, 77c-4, and 77c-5, it is to be understood that the memory storage 77c can include more or less queues. Furthermore, it is it is to be understood, with the benefit of this description, that the plurality of queues 77c-1, 77c-2, 77c-3, 77c-4, and 77c-5 can be physically located on different memory storage devices or can be store on different portions of the same memory device. Furthermore, it is to be appreciated, with the benefit of this description that in some embodiments, each of the queues in the plurality of queues 77c-1, 77c-2, 77c-3, 77c-4, and 77c-5 can be associated with a specific message type, for example, a message representing an order for a specific security or group of securities. In other embodiments, the plurality of queues 77c-1, 77c-2, 77c-3, 77c-4, and 77c-5 can be associated with a specific component or group of components of the order processing engine 72c. In yet another embodiment, the plurality of queues 77c-1, 77c-2, 77c-3, 77c-4, and 77c-5 can be used and assigned based on a load balancing algorithm.

In general terms, the gateway 68c is generally configured to handle input and output messages to the primary server 62c. However, it is to be re-emphasized that the structure described in the present embodiment is a non-limiting representation. For example, although the present embodiment shown in FIG. 12 shows the session manager 76c and the memory storage 77c as separate modules within the primary server 62c, it is to be appreciated that modifications are contemplated and that several different configurations are within the scope of the invention. For example, the session manager 76c and the memory storage 77c can be managed on a single processor core or the can be managed by a plurality of processor cores within the primary server 62c. In yet another embodiment, the primary server 62c can be a plurality of separate computing devices where the session manager 76c, and the memory storage 77c can operate on the separate computing devices.

In the present embodiment, the order processing engine 72c is generally configured to process an input message along with obtaining and processing deterministic information to generate an output message. In the present embodiment, the order processing engine 72c includes a plurality of engine components 88c-1, 88c-2, and 88c-3. Each of the engine components 88c-1, 88c-2, and 88c-3 includes a buffer 304c-1, 304c-2, and 304c-3, respectively, and a library 308c-1, 308c-2, and 308c-3, respectively. The engine components 88c-1, 88c-2, and 88c-3 are each configured to receive an input message from a queue of the plurality of queues 77c-1, 77c-2, 77c-3, 77c-4, and 77c-5 and to process the input message. In the present embodiment each of the engine components 88c-1, 88c-2, and 88c-3 is further configured to process a separate input message type associated with the specific engine component 88c-1, 88c-2, and 88c-3. It is to be appreciated, with the benefit of this description, that the type of input message associated with the specific engine component 88c-1, 88c-2, and 88c-3 does not necessarily involve the same grouping as discussed above in connection with the memory storage 77c. For example, the engine component 88c-1 can be configured to process input messages relating to a first group of securities, such as securities related to a specific industry sector or securities within a predetermined range of alphabetically sorted ticker symbols, whereas the engine component 88c-2 can be configured to process input messages relating to a second group of securities. Those skilled in the art will now appreciate that various input messages can be processed in parallel using corresponding engine components 88c-1, 88c-2, and 88c-3 to provide multi-threading, where several parallel processes can occur simultaneously. Since the availability of each of the engine components 88c-1, 88c-2, and 88c-3 can vary due to a number of conditions, the order processing engine 72c can give rise to non-deterministic results such that the first input message received at the session manager 76c may not necessarily correspond to the first output message generated by the order processing engine 72c unless further deterministic information is considered.

Accordingly, each of the engine components 88c-1, 88c-2, and 88c-3 processes deterministic information with each input message in order to maintain determinism. For example, in the present embodiment, the engine components 88c-1, 88c-2, and 88c-3 obtain a sequence number from the library 308c-1, 308c-2, and 308c-3, respectively, when processing the input message. It is to be appreciated, with the benefit of this description, that the sequence number provided by each library 308c-1, 308c-2, and 308c-3 can be used to maintain determinism of the system 54c.

It is to be re-emphasized that the order processing engine 72c described above is a non-limiting representation only. For example, although the present embodiment shown in FIG. 12 includes the order processing engine 72c having engine components 88c-1, 88c-2, and 88c-3, it is to be understood that the order processing engine 72c can have more or less engine components. Furthermore, it is it is to be understood, with the benefit of this description, that engine components 88c-1, 88c-2, and 88c-3 can be separate processes carried out by a single order processing engine running on one or more shared processor cores (not shown) of the primary server 62c or as separate processes carried out by separate processor cores assigned to each engine components 88c-1, 88c-2, and 88c-3. In yet another embodiment, the primary server 62c can be a plurality of separate computing devices where each of the engine components 88c-1, 88c-2, and 88c-3 can be carried out on separate computing devices.

The clock 300c is generally configured to measure time and to provide a timestamp when requested. The manner by which the clock 300c measures time is not particularly limited and can include a wide variety of mechanisms for measuring time. Furthermore, the manner by which a timestamp is provided is not particularly limited. In the present embodiment, timestamp is obtained by making a function call to the clock 300c.

It is to be appreciated that the manner by which the timestamp is obtained is not particularly limited. For example, the clock 300c can be modified to be another process configured to receive a call message from a component of the order processing engine 72c requesting a timestamp. In response, a timestamp message can be returned to the component of the order processing engine 72c that requested the timestamp. In other embodiments, the clock 300c can also be modified to provide a continuous stream of timestamp messages to the order processing engine 72c.

Similar to the primary server 62c, the backup server 64c can be any type of computing device operable to receive and process input messages and deterministic information from the client machine 54c. It is to be understood that the backup server 64c is not particularly limited to any machine and that several different types of computing devices are contemplated such as those contemplated for the primary server 62c. The backup server 64c is configured to assume a primary role, normally assumed by the primary server 62c, during a failover event and a backup role at other times. Although the schematic block diagram of FIG. 12 shows the primary server 62c and the backup server 64c having two different sizes, it is to be understood that the schematic block diagram is intended to show the internal components of the primary server 62c. Accordingly, in the present embodiment, the backup server 64c includes similar hardware and software as the primary server 62c. However, in other embodiments, the backup server 64c can be a different type of computing device capable of carrying out similar operations.

Figure 13:
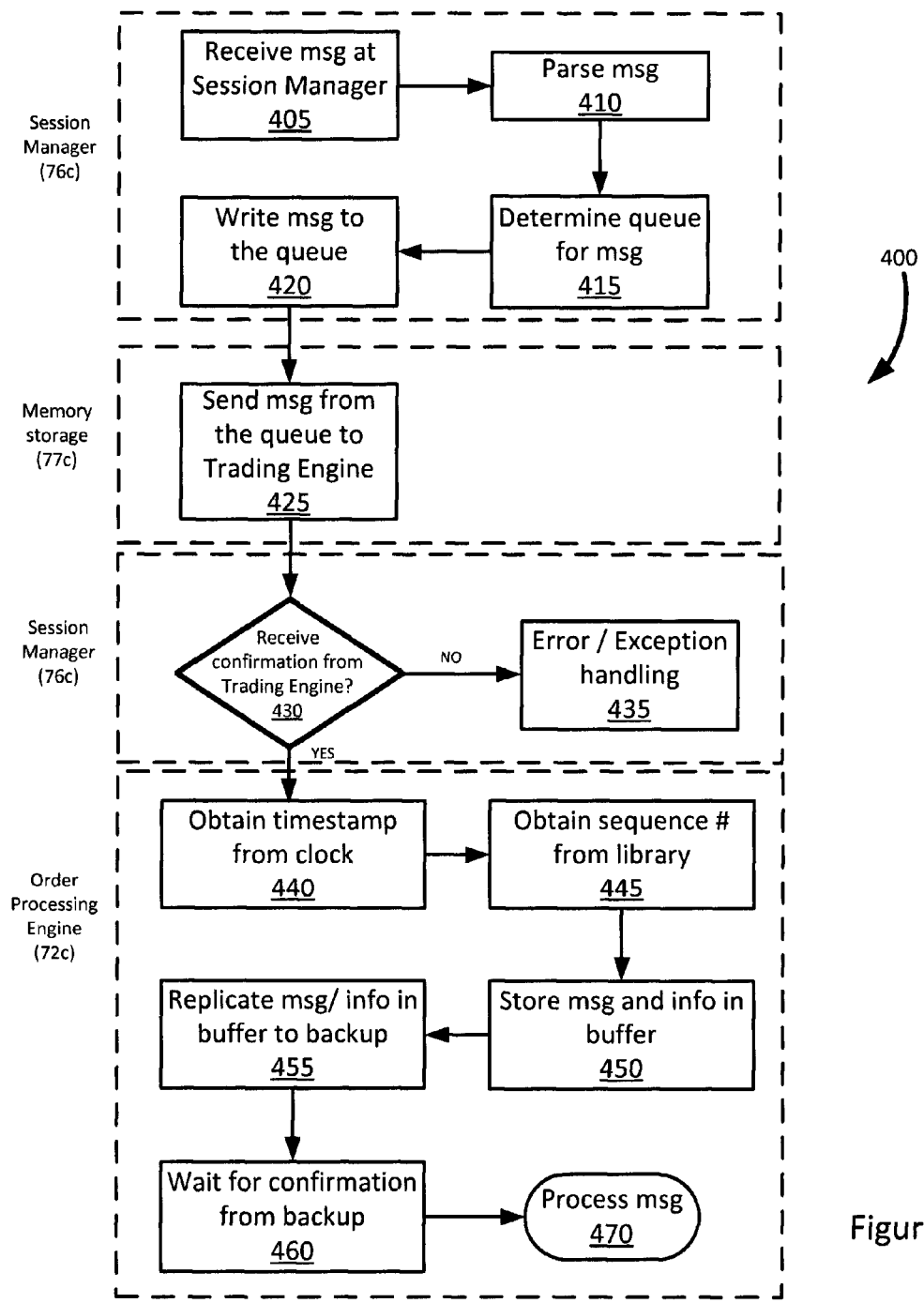
FIG. 13 is a flow chart of a method of failover in accordance with another embodiment.

Referring now to FIG. 13, a flowchart depicting another embodiment of a method for processing orders at a primary server 62c is indicated generally at 400. In order to assist in the explanation of the method, it will be assumed that method 400 is carried out using system 50c as shown in FIG. 12. Furthermore, the following discussion of method 400 will lead to further understanding of system 50c and its various components. For convenience, various process blocks of method 400 are indicated in FIG. 13 as occurring within certain components of system 50c. Such indications are not to be construed in a limiting sense. It is to be understood, however, that system 50c and/or method 400 can be varied, and need not work as discussed herein in conjunction with each other, and the blocks in method 400 need not be performed in the order as shown. For example, various blocks can be performed in parallel rather than in sequence. Such variations are within the scope of the present invention. Such variations also apply to other methods and system diagrams discussed herein.

Block 405 comprises receiving an input message from the client machine 54c at the session manager 76c. The type of input message is not particularly limited and is generally complementary to an expected type of input message for a service executing on the primary server 62c. In the present embodiment, the input message can be a "buy order", "sell order", or "cancel order" for a share. In addition, the input message can also be another type of message such as a price feed message. In the present example, the input message can be assumed to be the same as input message $M(O_1)$ described above in Table I for the purpose of describing the method 400.

Block 410 comprises parsing, at the session manager 76c, the input message $M(O_1)$. The manner by which the message is parsed is not particularly limited. In the present embodiment, the input message $M(O_1)$ is generally received at the session manager 76c as a single string. Accordingly, the session manager 76c can be configured to carry out a series of operations on the input message $M(O_1)$ in order to separate and identify the fields shown in Table I.

Block 415 comprises determining, at the session manager 76c, a queue in the memory storage 77c into which the input message $M(O_1)$ is to be written. The manner by which the determination is made is not particularly limited. For example, in the present embodiment, the session manager 76c includes a separate queue for each security identified in field number 2 of the input message $M(O_1)$ as shown in Table I. Accordingly, the session manager 76c can make the determination based on a list or lookup table corresponding the security name with the queue. In the present example, it is to be assumed that the input message $M(O_1)$ corresponds with the queue 77c-1.

Next, block 420 comprises writing the input message $M(O_1)$ to a queue in the memory storage 77c. Continuing with the present example, the session manager 76c writes the input message $M(O_1)$ to the queue 77c-1.

Block 425 comprises sending the input message $M(O_1)$ from the queue 77c-1 of the memory storage 77c to the order processing engine 72c. For the purpose of the present example, it is to be assumed that the input message $M(O_1)$ is sent to the engine component 88c-1. In the present embodiment, if the engine component 88c-1 successfully receives the input message $M(O_1)$, the engine component 88c-1 will provide the session manager 76c with a confirmation.

Block 430 comprises determining whether a confirmation has been received from the order processing engine 72c. For example, the session manager 76c can be configured to wait a predetermined amount of time for the confirmation to be received. If no confirmation is received within the predetermined time, the method 400 proceeds to block 435. Block 435 comprises an exception handling routine. It is to be appreciated that the manner by which block 435 is carried out is not particularly limited. For example, in some embodiments, block 435 can involve repeating block 425. In other embodiments, block 435 can include ending the method 400. If a confirmation is received, the session manager 76c has completed processing the input message $M(O_1)$ and removes it from the queue 77c-1 to provide space for additional input messages.

After providing the confirmation to the session manager 76c, the component of the order processing engine 72c will proceed with processing the input message $M(O_1)$. Continuing with the present example, upon receiving the input message $M(O_1)$, the engine component 88c-1 obtains a timestamp from the clock 300c at block 440. The manner by which the engine component 88c-1 obtains the timestamp from the clock 300c is not particularly limited. In the present embodiment, the engine component 88c-1 sends a call to the clock 300c. The clock 300c can then respond to the call with a timestamp. In other embodiments the engine component 88c-1 can continuously receive a feed of timestamps from which the engine component 88c-1 takes the most recently received timestamp value.

In the present example, block 445 comprises obtaining a sequence number from the library 308c-1. It is to be appreciated that in other examples of the system 50c, block 445 can involve obtaining a sequence number from the library 308c-2 or 308c-3 of the corresponding engine component 88c-2 or 88c-3, respectively, if these engine components were used instead of the engine component 88c-1. In other embodiments, it is to be understood with the benefit of this description, that a group of engine components can share one or more libraries. The manner by which the engine component 88c-1 obtains the sequence number from the library 308c-1 is not particularly limited. In the present embodiment, the engine component 88c-1 sends a call to the library 308c-1. The library 308c-1 can then respond to the call with a sequence number.

Block 450 comprises storing the input message M(O$_1$) and deterministic information such as the timestamp and the sequence number in the buffer 304c-1 for subsequent replication. It is to be appreciated that in other examples of the system 50c, block 450 can involve storing an input message in the buffer 304c-2 or 304c-3 of the corresponding engine component 88c-2 or 88c-3, respectively, if these engine components were used instead of the engine component 88c-1. In other embodiments, it is to be understood with the benefit of this description, that a group of engine components can share one or more buffers.

Block 455 comprises replicating the input message M(O$_1$) and deterministic information, such as the timestamp and the sequence number, stored in the buffer 304c-1 for subsequent replication to the backup server 64c. The manner by which the input message M(O$_1$) and the deterministic information are replicated is not particularly limited and can involve various manners from transferring data between servers. In the present embodiment, the input message M(O$_1$) and the deterministic information are replicated via the direct connection 60c.

Block 460 comprises waiting for a confirmation message from the backup server 64c that the replicated input message M(O$_1$) and the deterministic information has been received. In the present embodiment, during this waiting period, the order processing engine 72c is in an idle state where no further action is taken. It is to be appreciated that in some embodiments, the method 400 can be modified to include a timeout feature such that if no confirmation has been received before a predetermined length of time, the primary server 62c can identify a failure in the system 50c.

After receiving the confirmation from the backup server 64c, the method 400 proceeds to block 470 to process the input message M(O$_1$) and the deterministic information. Continuing with the present example, block 470 is carried out by the engine component 88c-1 to process the order for 1000 shares of ABC Co.

Figure 14:
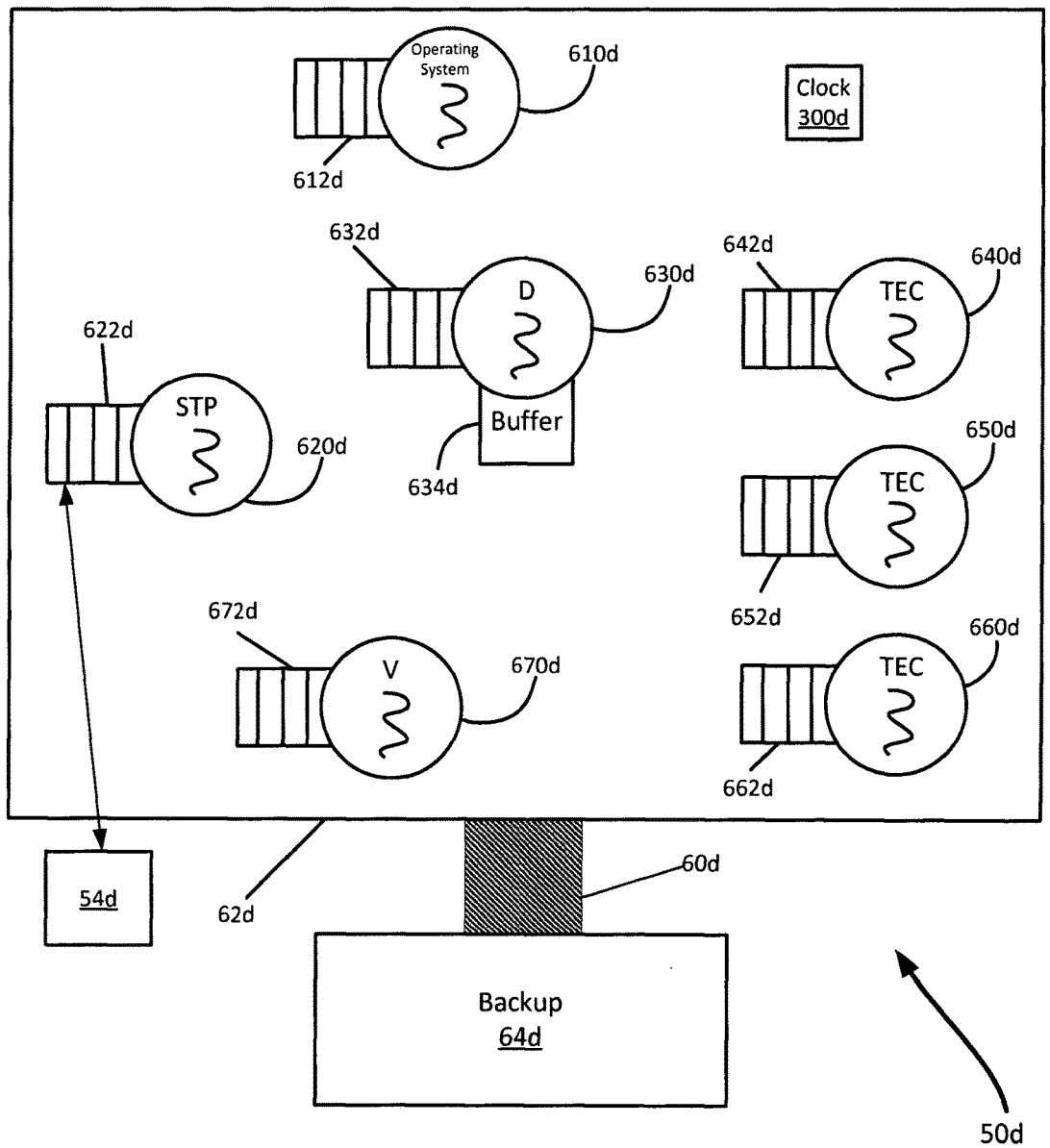
FIG. 14 is a schematic representation of a first and second server in accordance in accordance with another embodiment.

Referring to FIG. 14, a schematic block diagram of another embodiment of a system for failover is indicated generally at 50d. Like components of the system 50d bear like reference to their counterparts in the system 50, except followed by the suffix "d". The system 50d includes a client machine 54d, a primary server 62d, and a backup server 64d. In the present embodiment, a direct connection 60d connects the primary server 62d and the backup server 64d. The direct connection 60d is not particularly limited and can include various types of connections including those discuss above in connection with other embodiments.

In the present embodiment, the primary server 62d can be any type of computing device operable to receive and process input messages from the client machine 54d, such as those discussed above in connection with other embodiments. Similar to the primary server 62, the primary server 62d of the present embodiment operates as an on-line trading system, and is thus able to process input messages that include orders related to shares that can be traded on-line. For example, the orders can include an order to purchase or sell a share, or to cancel a previously placed order. More particularly in the present embodiment, the primary server 62d is configured to execute orders received from the client machine 54d.

In the present embodiment, instead of having processes carried out by various processor cores assigned by an operating system of the primary server 62d, the primary server 62d includes dedicated processor cores 610d, 620d, 630d, 640d, 650d, 660d, and 670d. Each of the dedicated processor cores 610d, 620d, 630d, 640d, 650d, 660d, and 670d are configured to carry out a single process or type of process. Furthermore, each of the processor cores 610d, 620d, 630d, 640d, 650d, 660d, and 670d includes a queue 612d, 622d, 632d, 642d, 652d, 652d, and 672d, respectively, for queuing messages to be processed.

The processor core 610d is generally configured to run an operating system for managing various aspects of the primary server 62d. The manner by which the operating system of the primary server 62d manages is not particularly limited and can involved various methods such as load balancing other processes among the remaining processor cores of the primary server 62d which have not been dedicated to a specific process.

The processor core 620d is generally configured to operate as a session termination point to receive an input message from the client machine 54c via a network and to send an output message to the client machine 54c via the network. It is to be understood that the manner by which the processor core 620d receives input messages is not particularly limited and a wide variety of different applications directed to on-line trading systems can be used.

The processor core 630d is generally configured to operate as a dispatcher. In the present embodiment the processor core 630d communicates with various resources, such as a clock 300d to obtain deterministic information, such as a timestamp. In addition, the processor core 630d is further configured to assign a sequence number to be associated with the input message. Furthermore, the processor core 630d is configured to dispatch the input message and the deterministic information to another processor core 640d, 650d, or 660d for further processing.

The processor core 630d additionally includes a buffer 634d for storing an input message along with deterministic information. The processor core 630d is further configured to replicate the input message and the deterministic information to the backup server 64d. As discussed above, the deterministic information is not particularly limited and can include information from various sources such as a timestamp as well as the sequence number assigned by the processor core 630d.

In the present embodiment, the processor cores 640d, 650d, or 660d are each generally configured operate as engine cores. It is to be appreciated that in the present embodiment, the engine cores operate as trading engine cores (TEC); however, it is to be appreciated that the engine cores can be modified to be able to process other orders. In particular, the processor cores 640*d*, 650*d*, or 660*d* are configured to process an input message along with deterministic information. Each of the processor cores 640*d*, 650*d*, or 660*d* includes a queue 642*d*, 652*d*, and 660*d*, respectively. The queues 642*d*, 652*d*, or 662*d* are each configured to receive an input message and deterministic information from the processing core 630*d* for further processing. In the present embodiment each of the processor cores 640*d*, 650*d*, or 660*d* retrieves the input message and deterministic information for the queue 642*d*, 652*d*, or 662*d*, respectively and processes the input message and deterministic information. It is to be appreciated, with the benefit of this description, that each of the processor cores 640*d*, 650*d*, or 660*d* is configured to receive a different type of input message. The type of input message associated with the specific processor cores 640*d*, 650*d*, or 660*d* is not particularly limited and can be determined using a variety of methods such as analyzing the contents of the input message. For example, the processor core 640*d* can be configured to process input messages relating to a first group of securities, such as securities related to a specific industry sector or securities within a predetermined range of alphabetically sorted ticker symbols, whereas the processor core 650*d* can be configured to process input messages relating to a second group of securities. Those skilled in the art will now appreciate that various input messages can be processed in parallel using corresponding processor cores 640*d*, 650*d*, or 660*d* to provide multi-threading, where several parallel processes can occur simultaneously. Since the availability of each of the processor cores 640*d*, 650*d*, or 660*d* can vary due to a number of conditions, the process can give rise to non-deterministic results such that the first input message received at the processor core 620*d* may not necessarily correspond to the first output processed unless the deterministic information is considered.

It is to be re-emphasized that each of the processor cores 640*d*, 650*d*, or 660*d* described above is a non-limiting representation only. For example, although the present embodiment shown in FIG. 14 includes three processor cores 640*d*, 650*d*, or 660*d* as engine cores, it is to be understood that the primary server 62*d* can be modified to include more or less engine cores.

The processor core 670*d* is generally configured to receive an output message from the processor cores 640*d*, 650*d*, or 660*d* and compare it with the output message received from a the backup server 64*c*. The output message is not particularly limit and generally includes a result of processing the input message from the processor cores 640*d*, 650*d*, or 660*d*. For example, when the input message is an order to purchase a share, the output message from the processor cores 640*d*, 650*d*, or 660*d* can indicate whether the share has been purchased or whether the order for the purchase the share was unable to be filled in accordance with parameters identified in the input message. Similarly, when the input message is an order to sell a share, the output message from the processor cores 640*d*, 650*d*, or 660*d* can indicate whether the share has been sold or whether the order to sell the share was unable to be filled in accordance with parameters identified in the input message It is to be appreciated that the processor core 670*d* carries out a verification role to ensure that the output generated at the backup server 64*c* is consistent with the output generated at the primary server 62*d*.

The clock 300*d* is generally configured to operate as a tick counter and is generally configured to measure time for providing a timestamp when a function call is made. The manner by which the clock 300*d* measures time is not particularly limited and can include a wide variety of mechanisms for measuring time. Furthermore, the manner by which a timestamp is provided is not particularly limited. In the present embodiment, the clock 300*d* is configured to receive a call message from processor core 630*d* requesting a timestamp. In response, the clock 300*d* sends a timestamp message to the processor core 630*d*. In other embodiments, the clock 300*d* can be configured to send timestamp messages to the processor core 630*d* continuously.

Similar to the primary server 62*d*, the backup server 64*d* can be any type of computing device operable to receive and process input messages and deterministic information from the client machine 54*d*. It is to be understood that the backup server 64*d* is not particularly limited to any machine and that several different types of computing devices are contemplated such as those contemplated for the primary server 62*d*. The backup server 64*d* is configured to assume a primary role normally assumed by the primary server 62*d*, during a failover event and a backup role at other times. Although the schematic block diagram of FIG. 14 shows the primary server 62*d* and the backup server 64*d* having two different sizes, it is to be understood that the schematic block diagram is intended to show the internal components of the primary server 62*d*. Accordingly, in the present embodiment, the backup server 64*d* includes similar hardware and software as the primary server 62*d*. However, in other embodiments, the backup server 64*d* can be a different type of computing device capable of carrying out similar operations.

Figure 15:
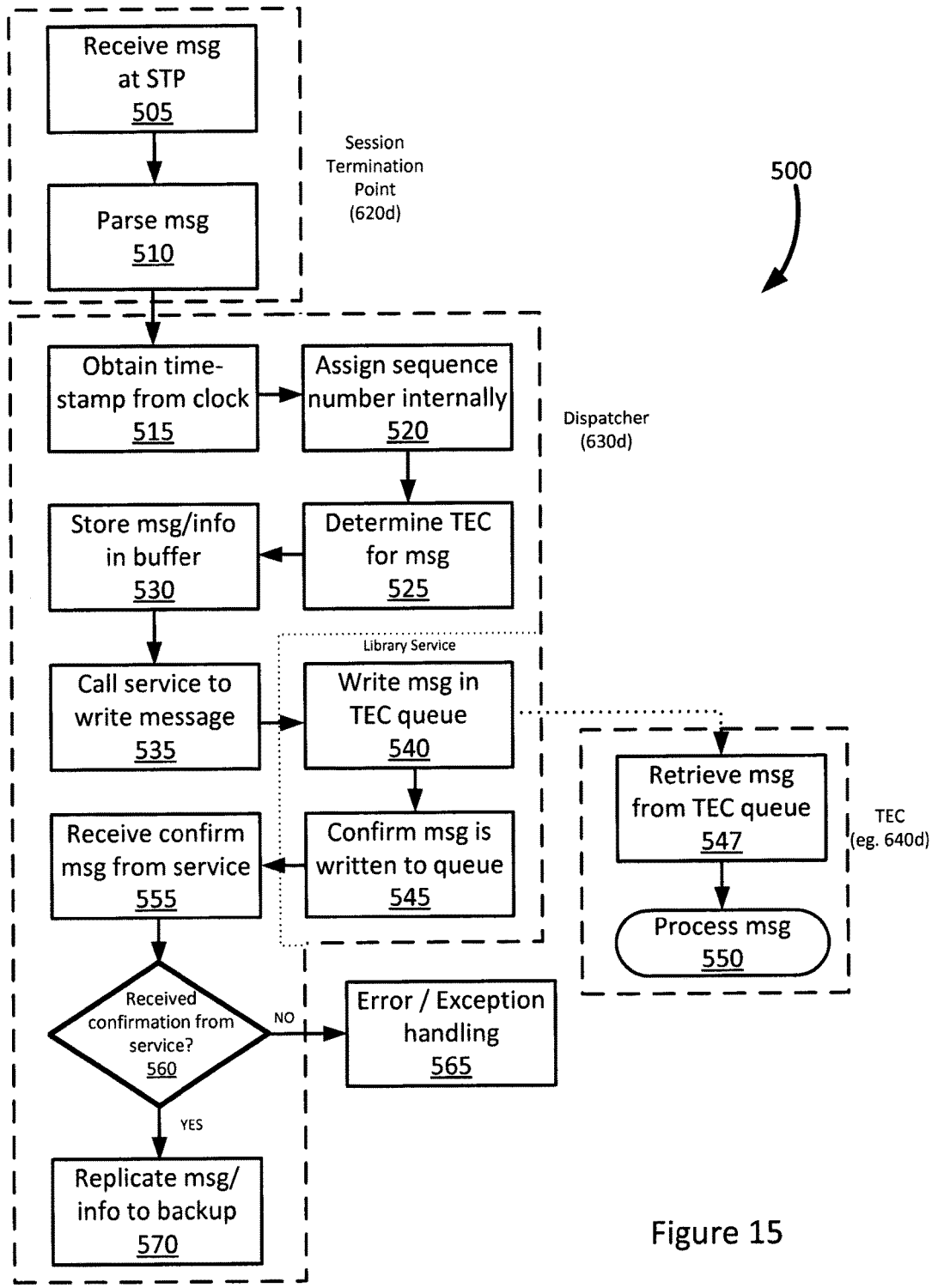
FIG. 15 is a flow chart of a method of failover in accordance with another embodiment.

Referring now to FIG. 15, a flowchart depicting another embodiment of a method for processing orders at a primary server 62*d* is indicated generally at 500. In order to assist in the explanation of the method, it will be assumed that method 500 is carried out using system 50*d* as shown in FIG. 14. Furthermore, the following discussion of method 500 will lead to further understanding of system 50*d* and its various components. For convenience, various process blocks of method 500 are indicated in FIG. 15 as occurring within certain components of system 50*d*. Such indications are not to be construed in a limiting sense. It is to be understood, however, that system 50*d* and/or method 500 can be varied, and need not work as discussed herein in conjunction with each other, and the blocks in method 500 need not be performed in the order as shown. For example, various blocks can be performed in parallel rather than in sequence. Such variations are within the scope of the present invention. Such variations also apply to other methods and system diagrams discussed herein.

Block 505 comprises receiving an input message from the client machine 54*d* at the processor core 620*d*. The type of input message is not particularly limited and is generally complementary to an expected type of input message for a service executing on the primary server 62*d*. In the present embodiment, the input message can be a "buy order", "sell order", or "cancel order" for a share. In addition, the input message can also be another type of message such as a price feed message. In the present example, the input message can be assumed to be the same as input message $M(O_1)$ described above in Table I for the purpose of describing the method 500.

Block 510 comprises parsing, at the processor core 620*d*, the input message $M(O_1)$. The manner by which the message is parsed is not particularly limited. In the present embodiment, the input message $M(O_1)$ is generally received at the processor core 620*d* as a single string. Accordingly, the processor core 620*d* can be configured to carry out a series of operations on the input message $M(O_1)$ in order to separate and identify the fields shown in Table I. After parsing the input message M(O$_1$), the processor core 620*d* writes the parsed input message M(O$_1$) into the queue 632*d* for the processor core 630*d*.

Block 515 comprises the processor core 630*d* obtaining a timestamp from the clock 300*d*. The manner by which the processor core 630*d* obtains the timestamp from the processor clock 300*d* is not particularly limited. In the present embodiment, the processor core 630*d* sends a call to the clock 300*d*. The clock 300*d* can then respond to the call with a timestamp. In other embodiments the processor core 630*d* can continuously receive a feed of timestamps from the clock 300*d*. Accordingly, the processor core 630*d* can then use the most recently received timestamp value.

Block 520 comprises the processor core 630*d* assigning a sequence number to be associated with the input message M(O$_1$). The manner by which the sequence number is assigned is not particularly limited. In the present embodiment, the processor core 630*d* carries out a routine to provide sequence numbers based on the order which input messages arrive. In the present embodiment, the timestamp and the sequence number for at least a portion of the deterministic information associate with the input message M(O$_1$).

Block 525 comprises the processor core 630*d* determining the queue 642*d*, 652*d*, or 662*d* into which the input message M(O$_1$) and the deterministic information obtained in blocks 515 and 520 are to be written. The manner by which the determination is made is not particularly limited. For example, in the present embodiment, the processor core 630*d* can use field number 2 of the input message M(O$_1$) as shown in Table I to determine which processor core 640*d*, 650*d*, or 660*d* is associated with the security. Accordingly, the processor core 630*d* can make the determination based on a list or lookup table corresponding the security name with the queue. Continuing with the present example, it is to be assumed that the input message M(O$_1$) corresponds with the processor core 640*d*.

Block 530 comprises storing the input message M(O$_1$) and deterministic information, such as the timestamp and the sequence number in the buffer 634*d* for subsequent replication.

In the present example with the input message M(O$_1$), the processor core 630*d* calls a service from a library at block 535. The service is a sub-process generally configured to write the input message M(O$_1$) and the deterministic information obtained from blocks 515 and 520 into the queue 642*d*. The input message M(O$_1$) and the deterministic information are written to the queue 642*d* for subsequent processing at block 540 by the service. Accordingly, in the present embodiment, the service is called by the processor core 630*d* and carried out by the processor core 630*d*. Upon a successful completion of the writing operation by the service, the service will provide a confirmation at block 545.

It is to be appreciated with the benefit of this description, that once the service has completed the writing operation of the input message M(O$_1$) and the deterministic information to the queue 642*d*, the input message M(O$_1$) and the deterministic information will subsequently be retrieved by the processing core 640*d* in the present example at block 547. The input message M(O$_1$) is then processed by the processor core 640*d* at block 550. Continuing with the present example, block 550 is carried out by the processor core 640*d* to process the order for 1000 shares of ABC Co.

Returning to the process carried out in the processor core 630*d* of the present example, block 555 comprises receiving a result from the called service that the input message M(O$_1$) and the deterministic information has been successfully written to the queue 642*d*. It is to be appreciated that in the present embodiment, the processor core 630*d* is used to sequentially carry out block 540 and block 545 while the input message M(O$_1$) and the deterministic information stored in the buffer 634*d* remains unchanged.

Although the present embodiment shows that the service from the library operates as a function call by the processor core 630*d* such that the service is carried out as a sub-process on the processor core 630*d*, it is to be appreciated that other embodiments are contemplated and that variations are considered. For example, in other embodiments, the method 500 can be modified such that the library service is carried out on a different processor core (not shown) as long as increased latency can be tolerated. In such embodiments, the processor core 630*d* sends a message and waits for the confirmation message between blocks 535 and 555 as a separate processor core carries out the services described above. Furthermore, a timeout feature can be included in such embodiments such that if no confirmation message has been received before a predetermined length of time, the primary server 62*d* can identify a failure in the system 50*d*.

Block 560 comprises determining whether the result from the service is a confirmation has been received from the service. If no confirmation is received, the method 500 proceeds to block 565. Block 565 comprises an exception handling routine. It is to be appreciated that the manner by which block 565 is carried out is not particularly limited. For example, in some embodiments, block 565 can involve repeating block 535. In other embodiments, block 565 can include ending the method 500. If a confirmation is received, the processor core 630*d* proceeds to block 570.

Block 570 comprises replicating the input message M(O$_1$) and deterministic information, such as the timestamp and the sequence number, stored in the buffer 634*d* to the backup server 64*d*. The manner by which the input message M(O$_1$) and the deterministic information are replicated is not particularly limited and can involve various manners from transferring data between servers. In the present embodiment, the input message M(O$_1$) and the deterministic information are replicated via the direct connection 60*d*. It is to be appreciated with the benefit of this description, that since the processor core 630*d* waits for confirmation from the queue 642*d*, the processing of the input message M(O$_1$) and the deterministic information at the processor core 640*d* would have generally started prior to the actual replication of input message M(O$_1$) and the deterministic information for increasing efficiency of the overall system 50*d*.

It is to be appreciated, with the benefit of this description that block 547 is carried out almost immediately after block 540 on a processor core 640*d* that is separate from the processor core 630*d*. Meanwhile, blocks 545 to 570 are carried out on the processor core 630*d*. The numbers of operations carried out at the processor core 640*d* and the processor core 630*d* can be specifically configured as shown such that block 550 is carried out prior to block 570. It is to be understood, with the benefit of this description, that in the present embodiment, the operations involved with block 550 generally use more time to be carried out than the operations of block 570. Accordingly, by starting block 550 before block 570, the system 50*d* can advantageously experience less idle time waiting for operations to be completed. For example, in tests, block 550 has been found to take about 5 μs to about 900 μs to complete. In particular, block 550 can take about 7 μs to about 100 μs to complete. More particularly, block 550 can take a median time of about 10 μs to complete. It is to be appreciated that in the present embodiment, the time needed to carry out block 550 is dependent on the complexity of an order such as how many parts the order is divided into in order to fill the order. Meanwhile, block 570 has been found to take up to 5 μs to complete. More particularly, block 570 can take about 1 μs to about 3 μs to complete. More particularly, block 570 can take a median time of about 2 μs to complete. Therefore, it is to be appreciated by a person of skill in the art having the benefit of this description, that a system with about five engine cores operating in parallel and associated with one dispatcher processor core can optimize the system 50d by minimizing the idle time on any processor core. In the present embodiment, the system 50d includes three processor cores 640d, 650d and 660d operating as engine cores. Therefore, it is to be appreciated that bottlenecks would tend to be advantageously in the engine cores of the system 50d instead of the replication process.

It is to be understood that the time to carry out each block is not particularly limited and the above is merely an example. In other embodiments, block 550 can have a median completion time greater than 10 μs such that the primary server 62d can be modified to accommodate more engine cores. In other embodiments, block 550 can have a median completion time less than 10 μs such that the primary server 62d can be modified to accommodate fewer engine cores so that the bottleneck does not occur at the dispatcher processor core.

Variations are contemplated. Although the present embodiment shown in FIG. 14 includes various designated processor cores, it is to be appreciated that not all processes need to be designated to a processor core and that a more or less processor cores can have designated processes. As an example, the session termination point can be a process carried out on the primary service 62d at a processor core determined by the operating system based on a load balancing algorithm while the processor cores 640d, 650d, and 660d are fixed a specific processor cores.

While only specific combinations of the various features and components of the present invention have been discussed herein, it will be apparent to those of skill in the art that desired subsets of the disclosed features and components and/or alternative combinations of these features and components can be utilized, as desired. Accordingly, while specific embodiments have been described and illustrated, the scope of the claims should not be limited by the preferred embodiments set forth above, but should be given the broadest interpretation consistent with the description as a whole.

What is claimed is:

1. A system for failover comprising:
a primary server configured to communicate with a client machine; and
a backup server in communication with the primary server, the backup server configured to communicate with the client machine during failover, the primary server comprising:
a primary session manager configured to receive an input message from the client machine;
a primary dispatcher configured to obtain a sequence number and a timestamp, the primary dispatcher further configured to dispatch the input message, the sequence number, and the timestamp to an associated primary engine component, the primary dispatcher further configured to replicate the input message, the sequence number, and the timestamp to the backup server;
a primary order processing engine having a plurality of primary engine components including the associated primary engine component, the primary order processing engine configured to process the input message to generate a primary output message, each primary engine component configured to process an input message type; and
a primary verification engine configured to receive the primary output message, the primary verification engine further configured to send a verification message to the backup server and to send the primary output message to the session manager for sending to the client machine; and
the backup server comprising:
a backup session manager configured to assume a primary role during a failover event;
a backup dispatcher configured to receive the input message, the sequence number, and the timestamp from the primary dispatcher, and further configured to dispatch the input message, the sequence number, and the timestamp to an associated backup engine component;
a backup order processing engine having a plurality of backup engine components including the associated backup engine component, each backup engine component configured to process a backup message type to generate a backup output message; and
a backup verification engine configured to receive the backup output message from the backup order processing engine and the verification message from the primary verification engine, the backup verification engine further configured to compare the verification message with the backup output message for verifying the primary output message.

2. The system of claim 1, wherein the backup dispatcher is further configured to generate a confirmation message after receiving the input message, the sequence number, and the timestamp from the primary dispatcher.

3. The system of claim 2, wherein the backup dispatcher is further configured to send the confirmation message to the primary verification engine.

4. The system of claim 3, wherein the primary verification engine is further configured to wait for the confirmation message prior to sending the primary output message to the session manager for sending to the client machine.

5. The system of claim 1, wherein the verification message comprises a copy of the primary output message.

6. The system of claim 1, further comprising a low latency link for connecting the primary server to the backup server.

7. The system of claim 6, wherein the low latency link comprises a PCIe link.

8. The system of claim 1, wherein the input message is associated with one of a buy order or a sell order for a stock.

9. The system of claim 1, wherein the input message type is associated with a group of stocks.

10. The system of claim 1, wherein the primary dispatcher is further configured to make an external call.

11. The system of claim 10, wherein the external call comprises a request for a price.

12. The system of claim 1, wherein the primary dispatcher is further configured to receive a price feed.

13. The system of claim 1, wherein the primary server is configured to begin processing the input message prior to replicating the input message to the backup server.

14. The system of claim 13, wherein the primary server is configured to complete to replicating the input message to the backup server prior to completion of processing the input message.

15. A primary server for communicating with a client machine, the primary server comprising:
a primary session manager configured to receive an input message from the client machine;
a primary dispatcher configured to obtain a sequence number and a timestamp, the primary dispatcher further configured to dispatch the input message and the sequence number to an associated primary engine component, the primary dispatcher further configured to replicate the input message, the sequence number, and the timestamp to a backup server;
a primary order processing engine having a plurality of primary engine components including the associated primary engine component, the primary order processing engine configured to process the input message to generate a primary output message, each primary engine component configured to process an input message type; and
a primary verification engine configured to receive the primary output message, the primary verification engine further configured to send a verification message to the backup server and to send the primary output message to the session manager for sending to the client machine.

16. The primary server of claim 15, further configured to receive a confirmation message from the backup server after replicating the input message, the sequence number, and the timestamp from the primary dispatcher.

17. The primary server of claim 16, wherein the primary verification engine is configured to receive the confirmation message.

18. The primary server of claim 17, wherein the primary verification engine is further configured to wait for the confirmation message prior to sending the primary output message to the session manager for sending to the client machine.

19. The primary server of claim 15, wherein the verification message comprises a copy of the primary output message.

20. The primary server of claims 15, further comprising a low latency link for connecting the primary server to the backup server.

21. The primary server of claim 20, wherein the low latency link comprises a PCIe link.

22. The primary server of claim 15, wherein the input message is associated with one of a buy order or a sell order for a stock.

23. The primary server of claim 15, wherein the input message type is associated with a group of stocks.

24. The primary server of claim 15, wherein the primary dispatcher is further configured to make an external call.

25. The primary server of claim 24, wherein the external call comprises a request for a price.

26. The primary server of claim 15, wherein the primary dispatcher is further configured to receive a price feed.

27. The primary server of any claim 15, wherein the primary server is configured to begin processing the input message prior to replicating the input message to the backup server.

28. The primary server of claim 27, wherein the primary server is configured to complete to replicating the input message to the backup server prior to completion of processing the input message.

29. A method of processing orders at a primary server, the method comprising:
receiving an input message from a client machine at a primary session manager;
obtaining a sequence number and a timestamp from a primary dispatcher;
dispatching, from the primary dispatcher, the input message, the sequence number, and the timestamp to an associated primary engine component;
replicating, from the primary dispatcher, the input message, the sequence number, and the timestamp to a backup server;
processing the input message at a primary engine component to generate a primary output message, wherein the primary engine component configured to process an input message type;
receiving the primary output message at a primary verification engine;
sending a verification message from the primary verification engine to the backup server; and
sending the primary output message to the session manager for sending to the client machine.

30. The method of claim 29, further comprising receiving a confirmation message from the backup server after replicating the input message, the sequence number, and the timestamp from the primary dispatcher.

31. The method of claim 30, further which receiving the confirmation message comprises receiving the confirmation message at primary verification engine.

32. The method of claim 31, further comprising waiting for the confirmation message prior to sending the primary output message to the session manager for sending to the client machine.

33. The method of claim 29, wherein the verification message comprises a copy of the primary output message.

34. The method of claim 29, further connecting the primary server to the backup server using a low latency link.

35. The method of claim 34, wherein the low latency link comprises a PCIe link.

36. The method of claim 29, wherein the input message is associated with one of a buy order or a sell order for a stock.

37. The method of claim 29, wherein the input message type is associated with a group of stocks.

38. The method of claim 29, further comprising making an external call from the primary dispatcher.

39. The method of claim 38, wherein making the external call comprises requesting a price.

40. The method of claim 29, further comprising receive a price feed at the primary dispatcher.

41. The method of claim 29, wherein processing the input message begins prior to replicating the input message to the backup server.

42. The method of claim 41, wherein replicating the input message to the backup server is completed prior to completion of processing the input message.

43. A non-transitory computer readable medium encoded with codes, the codes for directing a processor to:
receive an input message from a client machine;
obtain a sequence number and a timestamp;
dispatch the input message, the sequence number, and the timestamp to an associated primary engine component;
replicate, from a primary dispatcher, the input message, the sequence number, and the timestamp to a backup server;

process the input message at a primary engine component to generate a primary output message, wherein the primary engine component configured to process an input message type;
receive the primary output message at a primary verification engine;
send a verification message from the primary verification engine to the backup server; and
send the primary output message to a session manager for sending to the client machine.

* * * * *